US011029522B2

United States Patent
Sheraj et al.

(10) Patent No.: US 11,029,522 B2
(45) Date of Patent: Jun. 8, 2021

(54) METHOD AND BENDABLE DEVICE FOR CONSTRUCTING 3D DATA ITEM

(71) Applicant: Samsung Electronics Co., Ltd., Suwon-si (KR)

(72) Inventors: Mohammad Sheraj, Uttar Pradesh (IN); Ashish Chopra, Uttar Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/729,724

(22) Filed: Dec. 30, 2019

(65) Prior Publication Data

US 2021/0041700 A1 Feb. 11, 2021

(30) Foreign Application Priority Data

Aug. 7, 2019 (IN) .............................. 201941032000

(51) Int. Cl.
| | | |
|---|---|---|
| *G02B 27/01* | (2006.01) | |
| *G06F 1/16* | (2006.01) | |
| *G06F 3/01* | (2006.01) | |
| *G06T 15/20* | (2011.01) | |

(52) U.S. Cl.
CPC ....... *G02B 27/0172* (2013.01); *G06F 1/1652* (2013.01); *G06F 3/013* (2013.01); *G06T 15/205* (2013.01); *G02B 2027/014* (2013.01); *G02B 2027/0187* (2013.01)

(58) Field of Classification Search
CPC .......... G02B 27/0172; G02B 2027/014; G02B 2027/0187; G06T 15/205; G06F 3/013; G06F 1/1652; H04N 13/282
See application file for complete search history.

(56) References Cited

U.S. PATENT DOCUMENTS

| | | | |
|---|---|---|---|
| 8,754,961 B2 | 6/2014 | Leskela et al. | |
| 9,025,007 B1 * | 5/2015 | Parsons | ................ H04N 13/296 348/47 |
| 2006/0250322 A1 * | 11/2006 | Hall | ................... G02B 27/0172 345/8 |

(Continued)

FOREIGN PATENT DOCUMENTS

| | | |
|---|---|---|
| CN | 103945099 A | 7/2014 |
| KR | 10-2009-0039387 A | 4/2009 |

(Continued)

OTHER PUBLICATIONS

International Search Report and Written Opinion of the International Searching Authority in connection with International Application No. PCT/KR2019/018393 dated May 6, 2020, 7 pages.

*Primary Examiner* — Ibrahim A Khan

(57) ABSTRACT

A method for constructing a three dimensional (3D) data item in a bendable device. The method includes determining, by the bendable device, an inter-axial distance between at least two imaging sensors of the bendable device based on a biometric associated with eyes. Further, the method includes determining, by the bendable device, a bending angle of the bendable device based on the inter-axial distance. Further, the method includes constructing, by the bendable device, the 3D data item using the bending angle of the bendable device.

22 Claims, 21 Drawing Sheets

(56) References Cited

U.S. PATENT DOCUMENTS

| | | | |
|---|---|---|---|
| 2012/0001907 A1* | 1/2012 | Wilkinson | H04N 13/275 345/419 |
| 2012/0113232 A1* | 5/2012 | Joblove | H04N 13/243 348/48 |
| 2012/0169850 A1* | 7/2012 | Kim | H04N 13/282 348/47 |
| 2012/0200495 A1 | 8/2012 | Johansson | |
| 2013/0093660 A1* | 4/2013 | Hirsch | G06F 1/1652 345/156 |
| 2013/0215011 A1* | 8/2013 | Ke | G06F 1/1694 345/156 |
| 2014/0364229 A1 | 12/2014 | Yamamoto et al. | |
| 2015/0160698 A1* | 6/2015 | Tsukamoto | G06F 1/1647 345/1.3 |
| 2015/0234508 A1 | 8/2015 | Cho et al. | |
| 2015/0373480 A1* | 12/2015 | Park | G06F 3/04815 715/748 |
| 2016/0048170 A1* | 2/2016 | Kim | G06F 3/013 345/173 |
| 2016/0050408 A1* | 2/2016 | Lee | H04N 5/23245 348/47 |
| 2016/0078710 A1* | 3/2016 | Pierer | A63F 13/25 463/31 |
| 2016/0269720 A1* | 9/2016 | Patel | H04N 13/344 |
| 2017/0011706 A1* | 1/2017 | Namkung | G06F 1/1632 |
| 2017/0052566 A1* | 2/2017 | Ka | G06F 1/1694 |
| 2017/0115489 A1 | 4/2017 | Hu et al. | |
| 2018/0152550 A1 | 5/2018 | Dharmatilleke | |
| 2018/0217393 A1* | 8/2018 | Richards | G02B 27/017 |
| 2018/0307270 A1* | 10/2018 | Pantel | G06F 1/1605 |
| 2018/0373329 A1 | 12/2018 | Fisunenko et al. | |
| 2020/0128186 A1* | 4/2020 | Lombardi | G06F 1/1641 |

FOREIGN PATENT DOCUMENTS

| | | |
|---|---|---|
| KR | 10-1303203 B1 | 9/2013 |
| KR | 10-2015-0039463 A | 4/2015 |

\* cited by examiner

From simultaneous recording

Video from first imaging sensor and video from second imaging sensor = file 1 = IPD 1 : First user Video from first imaging sensor and video from third imaging sensor = file 2 = IPD 2 : Second user Video from first imaging sensor and video from fourth imaging sensor = file 3 = IPD 3 : Third user Video streams from each imaging sensor

METHOD AND BENDABLE DEVICE FOR CONSTRUCTING 3D DATA ITEM

CROSS REFERENCE TO RELATED APPLICATION

This application is based on and claims priority under 35 U.S.C. § 119 to an Indian Patent Complete Application No. 201941032000, filed on Aug. 7, 2019, the disclosure of which is incorporated by reference in its entirety.

BACKGROUND

1. Field

The disclosure relates to performing actions in an electronic device. More particularly relates to an electronic device and method for recording a multimedia file comprising at least one object in at least one of a recording mode and an effect.

2. Description of Related Art

In general, three dimensional (3D) images were provided using a polarized 3D technology which displays images on a single screen, but uses a polarizer on both an image source and 3D glasses, to create two different images for each eye of a user. With advancement in technology, any electronic device with a plurality of imaging sensors (e.g., camera) could be used to capture a 3D image. However, though the 3D image might be captured, an actual depth of an object captured in the 3D image cannot be predicted as the number of angles used to capture the 3D image is limited. Further, conventional 3D recording technologies provides the user with the 3D image which may not be a personalized 3D content for the user.

Electronic devices include a new class of bendable devices which have flexible display and can be used in a TV, a mobile device, tablet PC and the like. The bendable devices are of different types, as shown in FIGS. 3A-3B. Further, the possibility of using the bendable devices to capture the 3D images in greater depth may remain unexplored.

The above information is presented as background information only to help the reader to understand the present invention. Applicants have made no determination and make no assertion as to whether any of the above might be applicable as prior art with regard to the present application.

SUMMARY

An aspect of the disclosure is to provide a method for constructing a three dimensional (3D) data item in a bendable device.

Another aspect of the disclosure is to determine an inter-axial distance between at least two imaging sensors of the bendable device based on a biometric of eyes such as one of an inter-pupillary distance (IPD), an inter-iris distance (IID), an inter-retinal distance (IRD).

Another aspect of the disclosure is to determine a bending angle of the bendable device based on the inter-axial distance and a length of the bendable device across an axis of the bendable device.

Another aspect of the disclosure is to determine a shooting mode for constructing the 3D data item.

Another aspect of the disclosure is to select and configure the at least two imaging sensors for constructing the 3D data item using the bending angle.

Another aspect of the disclosure is to construct the 3D data item using the bending angle of the bendable device.

Accordingly the embodiments herein provide a method for constructing a three dimensional (3D) data item in a bendable device (100). The method includes determining, by the bendable device (100), an inter-axial distance between at least two imaging sensors of the bendable device (100) based on a biometric of the eyes. Further, the method includes determining, by the bendable device (100), a bending angle of the bendable device (100) based on the inter-axial distance. Further, the method includes constructing, by the bendable device (100), the 3D data item using the bending angle of the bendable device (100).

Accordingly the embodiments herein provide a bendable device (100) for constructing a three dimensional (3D) data item. The bendable device (100) a memory (160) and a processor (140) coupled to the memory (160). The processor (140) is configured to determine an inter-axial distance between at least two imaging sensors of the bendable device (100) based on a biometric of the eyes. The processor (140) is also configured to determine a bending angle of the bendable device (100) based on the inter-axial distance and construct the 3D data item using the bending angle of the bendable device (100).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
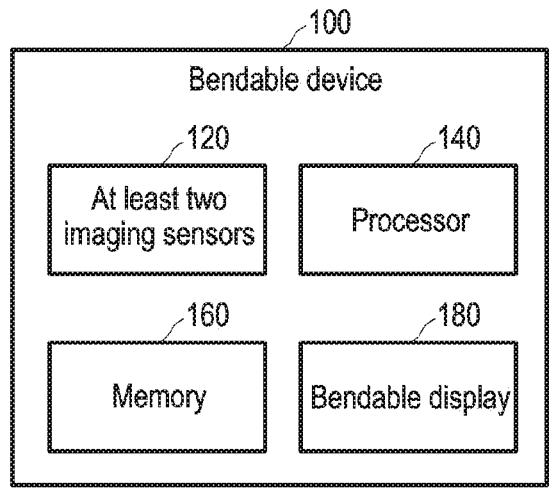
FIG. 1A illustrates a block diagram of a bendable device for constructing a three dimensional (3D) data item using a bending angle of the bendable device, according to an embodiment as disclosed herein.

FIGS. 1A through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness. Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for constructing a three dimensional (3D) data item in a bendable device (100). The method includes determining, by the bendable device (100), an inter-axial distance between at least two imaging sensors of the bendable device (100) based on a biometric associated with eyes. Further, the method includes determining, by the bendable device (100), a bending angle of the bendable device (100) based on the inter-axial distance. Further, the method includes constructing, by the bendable device (100), the 3D data item using the bending angle of the bendable device (100).

In an embodiment, the method for constructing, by the bendable device (100), the 3D data item using the bending angle of the bendable device (100) includes detecting a bending action performed by the user to achieve the determined bending angle. The method also includes performing a 3D spectrogram analysis by correlating a scene within a field of view of the at least two imaging sensors and a distance from the at least two imaging sensor. Further, the method includes determining a shooting mode based on the 3D spectrogram analysis and selecting the at least two imaging sensors for constructing the 3D data item using the bending angle. Furthermore, the method also includes configuring the at least one imaging sensor in the determined shooting mode and constructing the 3D data item using the bending angle of the bendable device (100).

In an embodiment, the method further includes determining, by the bendable device (100), a position of the at least one imaging sensor and configuring, by the bendable device (100), the at least one imaging sensor in the determined position. Further, the method also includes constructing, by the bendable device (100), the 3D data item using the bending angle of the bendable device (100).

In an embodiment, the shooting mode is at least one of a parallel shooting and a converged shooting.

In an embodiment, the method for determining, by the bendable device (100), the position of the at least one imaging sensor includes performing at least one of a rotation of the at least one imaging sensor, popping-up of the at least one imaging sensor from the bendable device (100), tilting of the at least one imaging sensor.

In an embodiment, the method for selecting, by the bendable device (100), the at least two imaging sensors for constructing the 3D data item using the bending angle includes determining a personalized biometric associated with the eyes for the user, wherein the personalized biometric associated with the eyes is specific to a user and identifying the at least two imaging sensors to be used for constructing the 3D data item based on the personalized biometric associated with the eyes for the user and a generalized biometric associated with the eyes, wherein the generalized biometric associated with the eyes is an average of the biometric associated with the eyes of a plurality of users. Further, the method also includes selecting the at least two imaging sensors for constructing the 3D data item using the bending angle.

In an embodiment, the biometric associated with the eyes is unique to the user of the bendable device (100), and wherein the biometric associated with the eyes is determined using the at least one imaging sensor of the bendable device (100).

In an embodiment, the bendable device (100) comprises at least two foldable display, a mechanical hinge along an axis of the at least two foldable display which enables folding of the at least two foldable display around the axis.

In an embodiment, the bendable device (100) is a flexible display which is rollable and foldable.

In an embodiment, the method further includes determining, by the bendable device (100), the inter-axial distance between the at least two imaging sensors of the bendable device (100) is equal to the biometric associated with the eyes; and automatically constructing, by the bendable device (100), the 3D data item of a scene within a field of view of the at least two imaging sensors, using the bending angle of the bendable device (100).

In an embodiment, the biometric of the eyes is one of the inter-pupillary distance (IPD), an inter-iris distance (IID), an inter-retinal distance (IRD).

Unlike to the conventional methods and systems, in the proposed method a realistic 3D view with personalized 3D content is constructed by the bendable device (100).

Unlike to the conventional methods and systems, in the proposed method actual depth of the scene can be predicted with the bending angle and the 3D spectrum analysis.

Unlike to the conventional methods and systems, in the proposed method when the user bends the bendable device (100) and the IAD becomes equal to the biometric associated with the eyes of the user, then the bendable device (100) automatically records the scene in a 3D mode.

Referring now to the drawings, and more particularly to FIGS. 1A through 13, where similar reference characters denote corresponding features consistently throughout the figures, there are shown embodiments.

FIG. 1A is a block diagram of the bendable device (100) for constructing the three dimensional (3D) data item using the bending angle of the bendable device (100), according to an embodiment as disclosed herein.

Referring to the FIG. 1A, the bendable device (100) can be, for example, a mobile phone, a smart phone, Personal Digital Assistant (PDA), a tablet, a wearable device, or the like. In an embodiment, the bendable device (100) includes at least two imaging sensors (120), a processor (140), a memory (160) and a bendable display (180).

In an embodiment, the at least two imaging sensors (120) are configured to preview a scene within the field of view of the at least two imaging sensors (120). Further, the at least two imaging sensors (120) are configured to determine the biometric associated with the eyes. The biometric associated with the eyes is unique to a particular user. The biometric associated with the eyes is one of the inter-pupillary distance (IPD), an inter-iris distance (IID), an inter-retinal distance (IRD).

In an embodiment, the processor (140) is configured to determine the inter-axial distance between the at least two imaging sensors (120) of the bendable device (100) based on the biometric associated with the eyes. The processor (140)

is also configured to determine the bending angle of the bendable device (100) based on the inter-axial distance and a length of the bendable device (100) across an axis of the bendable device (100) and construct the 3D data item using the bending angle of the bendable device (100).

In an embodiment, the memory (160) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (160) may, in some examples, be considered a non-transitory storage medium. The term "non-transitory" may indicate that the storage medium is not embodied in a carrier wave or a propagated signal. However, the term "non-transitory" should not be interpreted that the memory (160) is non-movable. In some examples, the memory (160) is configured to store large amounts of information than the memory (160). In certain examples, a non-transitory storage medium may store data that can, over time, change (e.g., in Random Access Memory (RAM) or cache).

In an embodiment, the bendable display (180) is configured to display the scene within the field of view of the at least two imaging sensors (120). Further, the bendable display (180) is configured to display the 3D data item which is constructed by the processor (140) in the determined shooting mode. Further, the 3D data item may be displayed either on the entire display area of the bendable display (180) or in a portion of the bendable display (180).

Although the FIG. 1A shows the hardware elements of the bendable device (100), it is to be understood that other embodiments are not limited thereon. In other embodiments, the bendable device (100) may include less or more elements. Further, the labels or names of the elements are used only for illustrative purpose and do not limit the scope of the invention. One or more components can be combined together to perform same or substantially similar functions.

Figure 1B:
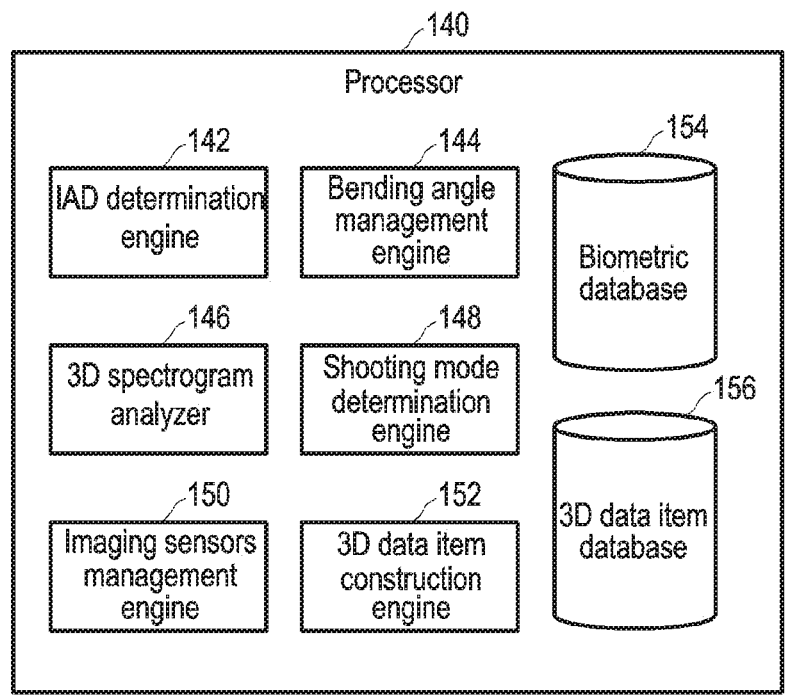
FIG. 1B illustrates a block diagram of various components of a processor of the bendable device for constructing the three dimensional (3D) data item, according to an embodiment as disclosed herein.

FIG. 1B illustrates a block diagram of various components of the processor (140) for constructing the three dimensional (3D) data item, according to an embodiment as disclosed herein.

Referring to the FIG. 1B, the processor (140) includes an IAD determination engine (142), a bending angle management engine (144), a 3D spectrogram analyzer (146), a shooting mode determination engine (148), a imaging sensors management engine (150), a 3D data item construction engine (152), a biometric database (154) and a 3D data item database (156).

In an embodiment, the IAD determination engine (142) is configured to determine the inter-axial distance (IAD) between the at least two imaging sensors (120) of the bendable device (100) based on the biometric associated with the eyes. Further, the IAD determination engine (142) is capable of measuring the IAD for a plurality of users. The IAD determination engine (142) is also configured to determine a generalized biometric associated with the eyes based on the personalized biometric associated with the eyes of the plurality of users, which is stored in the biometric database (154).

In an embodiment, the bending angle management engine (144) is configured to detect the bending action performed by the user to achieve the determined bending angle. Further, the bending angle management engine (144) is configured to receive the IAD determined by the IAD determination engine (142) and also determine the length of the bendable device (100) across an axis of the bendable device (100) i.e., l, 180° distance between the at least two imaging sensors (120) of the bendable device (100). Further, the bending angle management engine (144) is configured to compute the bending angle θ based on the IAD and the l as:

$$\text{Bending angle } \theta = 2\sin^{-1}\left(\frac{IAD}{l}\right) \quad (1)$$

The bending angle management engine (144) is also configured to detect a bending action performed by the user where the IAD between the at least two imaging sensors (120) of the bendable device (100) is equal to the biometric associated with the eyes.

In an embodiment, the 3D spectrogram analyzer (146) is configured to perform the 3D spectrogram analysis by correlating the scene within the field of view of the at least two imaging sensors (120) and the distance from the at least two imaging sensor (120) to an object in the scene.

In an embodiment, the shooting mode determination engine (148) is configured to receive the input from the 3D spectrogram analyzer (146) and determine the shooting mode based on the 3D spectrogram analysis. The shooting mode is at least one of a parallel shooting and a converged shooting.

In an embodiment, the imaging sensors management engine (150) is configured to select the at least two imaging sensors for constructing the 3D data item using the bending angle based on the shooting mode which is selected. Further, the imaging sensors management engine (150) also configures the at least one imaging sensor (120) in the determined shooting mode.

In another embodiment, the imaging sensors management engine (150) is configured to determine a position of the at least one imaging sensor (120) and configure the at least one imaging sensor (120) in the determined position. The determined position of the at least one imaging sensor (120) is achieved performing at least one of a rotation of the at least one imaging sensor (120), popping-up of the at least one imaging sensor (120) from the bendable device (100), tilting of the at least one imaging sensor (120).

In an embodiment, the 3D data item construction engine (152) is configured to construct the 3D data item of the objects in the scene within the field of view of the at least one imaging sensor (120) using the bending angle of the bendable device (100).

In another embodiment, the 3D data item construction engine (152) is configured to automatically construct the 3D data item of the scene within the field of view of the at least two imaging sensors (120) using the bending angle, when the bending angle management engine (144) detects that the IAD between the at least two imaging sensors (120) of the bendable device (100) is equal to the biometric associated with the eyes.

In an embodiment, the biometric database (154) is configured to store the personalized biometric associated with the eyes for a plurality of users, which is used to determine the generalized biometric associated with the eyes. The generalized biometric associated with the eyes is an average of the biometric associated with the eyes for the plurality of users.

In an embodiment, the 3D data item database (156) is configured to store the 3D data item which is constructed by the 3D data item construction engine (152).

Figure 2A:
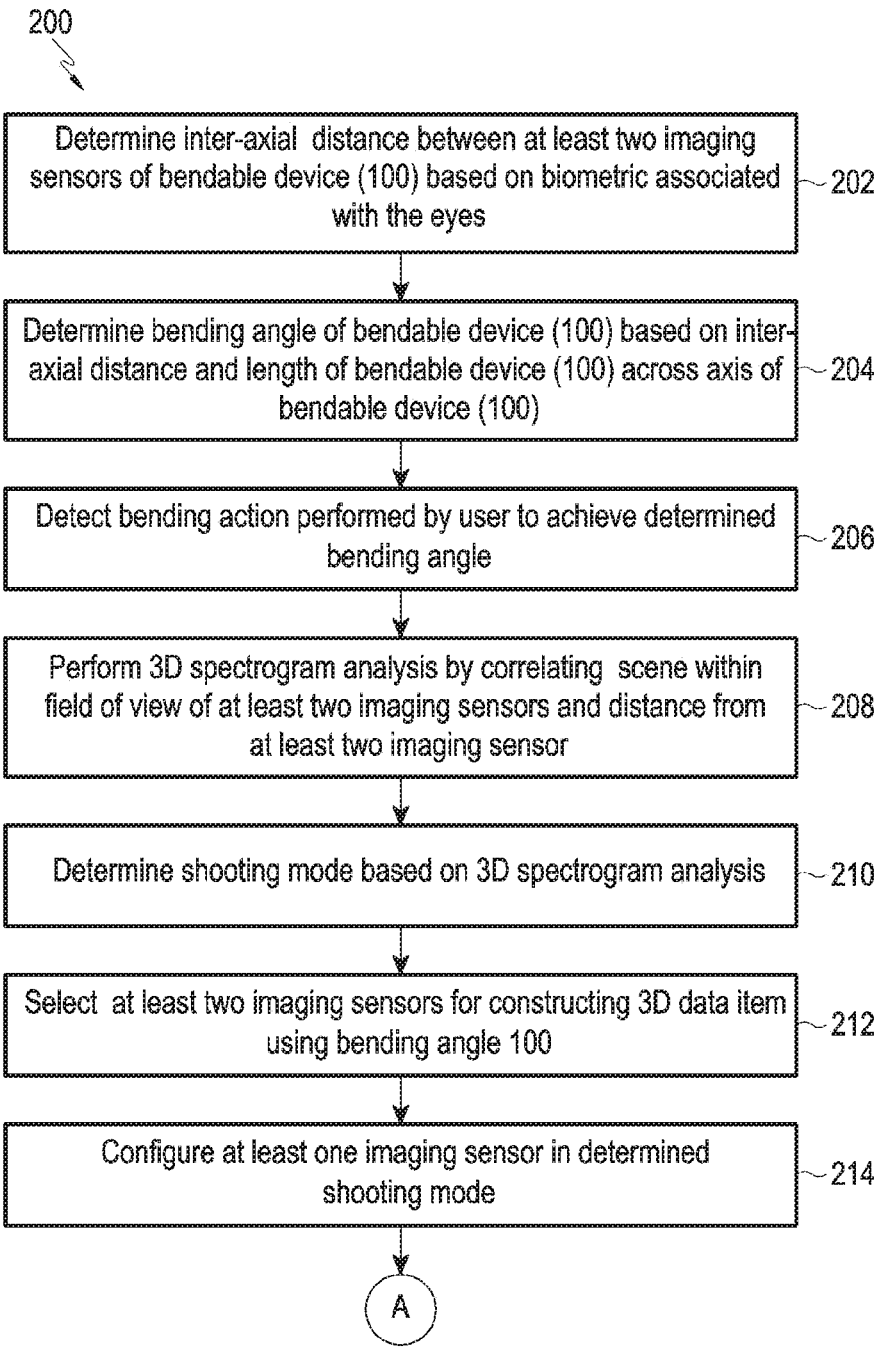
FIGS. 2A and 2B are flow charts illustrating a method for constructing the 3D data item in the bendable device, according to an embodiment as disclosed herein.
Figure 2B:
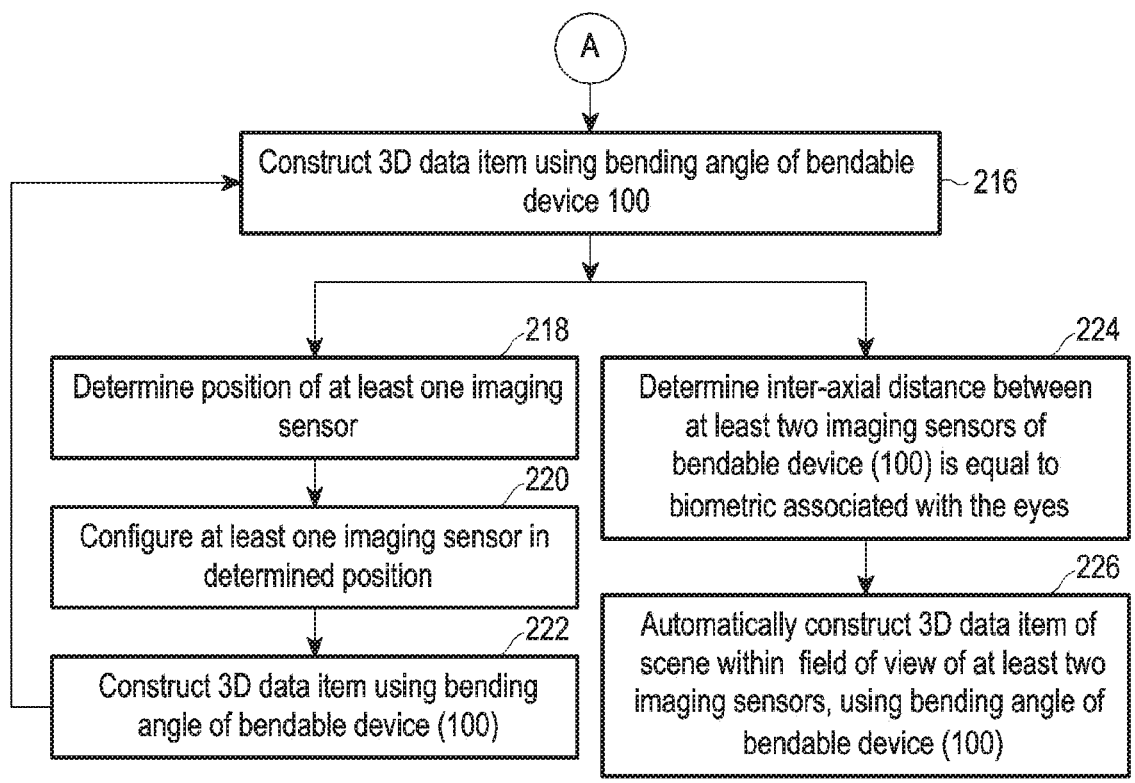

FIGS. 2A and 2B are flow charts 200 illustrating a method for constructing the 3D data item in the bendable device (100), according to an embodiment as disclosed herein.

Referring to the FIG. 2A, at step 202 the bendable device (100) determines the inter-axial distance between the at least two imaging sensors (120) of bendable device (100) based on the biometric associated with the eyes. For example, in the bendable device (100) as illustrated in the FIG. 1A, the processor (140) can be configured to determine the inter-axial distance between the at least two imaging sensors (120) of bendable device (100) based on the biometric associated with the eyes.

At step 204, the bendable device (100) determines the bending angle based on the inter-axial distance and the length of the bendable device (100) across the axis of the bendable device (100). For example, in the bendable device (100) as illustrated in the FIG. 1A, the processor (140) can be configured to determine the bending angle based on the inter-axial distance and the length of the bendable device (100) across the axis of the bendable device (100).

At step 206, the bendable device (100) detects the bending action performed by the user to achieve the determined bending angle. For example, in the bendable device (100) as illustrated in the FIG. 1A, the processor (140) can be configured to detect the bending action performed by the user to achieve the determined bending angle.

At step 208, the bendable device (100) performs the 3D spectrogram analysis by correlating the scene within the field of view of the at least two imaging sensors (120) and the distance from at least two imaging sensor (120). For example, in the bendable device (100) as illustrated in the FIG. 1A, the processor (140) can be configured to perform the 3D spectrogram analysis by correlating the scene within the field of view of the at least two imaging sensors (120) and the distance from at least two imaging sensor (120).

At step 210, the bendable device (100) determines the shooting mode based on the 3D spectrogram analysis. For example, in the bendable device (100) as illustrated in the FIG. 1A, the processor (140) can be configured to determine the shooting mode based on the 3D spectrogram analysis.

At step 212, the bendable device (100) selects the at least two imaging sensors (120) for constructing 3D data item using bending angle. For example, in the bendable device (100) as illustrated in the FIG. 1A, the processor (140) can be configured to select the at least two imaging sensors (120) for constructing 3D data item using bending angle.

At step 214, the bendable device (100) configures the at least one imaging sensor (120) in the determined shooting mode. For example, in the bendable device (100) as illustrated in the FIG. 1A, the processor (140) can be configured to configure the at least one imaging sensor (120) in the determined shooting mode.

Referring to the FIG. 2B, at step 216, the bendable device (100) constructs the 3D data item using the bending angle. For example, in the bendable device (100) as illustrated in the FIG. 1A, the processor (140) can be configured to) constructs the 3D data item using the bending angle.

At step 218, the bendable device (100) determines the position of the at least one imaging sensor (120). For example, in the bendable device (100) as illustrated in the FIG. 1A, the processor (140) can be configured to determine the position of the at least one imaging sensor (120).

At step 220, the bendable device (100) configures the at least one imaging sensor (120) in the determined position. For example, in the bendable device (100) as illustrated in the FIG. 1A, the processor (140) can be configured to arrange the at least one imaging sensor (120) in the determined position.

At step 222, the bendable device (100) loops to step 216.

At step 224, the bendable device (100) determines the inter-axial distance between the at least two imaging sensors (120) of bendable device (100) is equal to the biometric associated with the eyes. For example, in the bendable device (100) as illustrated in the FIG. 1A, the processor (140) can be configured to determine the inter-axial distance between the at least two imaging sensors (120) of bendable device (100) is equal to the biometric associated with the eyes.

At step 226, the bendable device (100) automatically constructs the 3D data item of the scene within the field of view of the at least two imaging sensors (120), using the bending angle. For example, in the bendable device (100) as illustrated in the FIG. 1A, the processor (140) can be configured to automatically construct the 3D data item of the scene within the field of view of the at least two imaging sensors (120), using the bending angle of the bendable device (100).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3A:
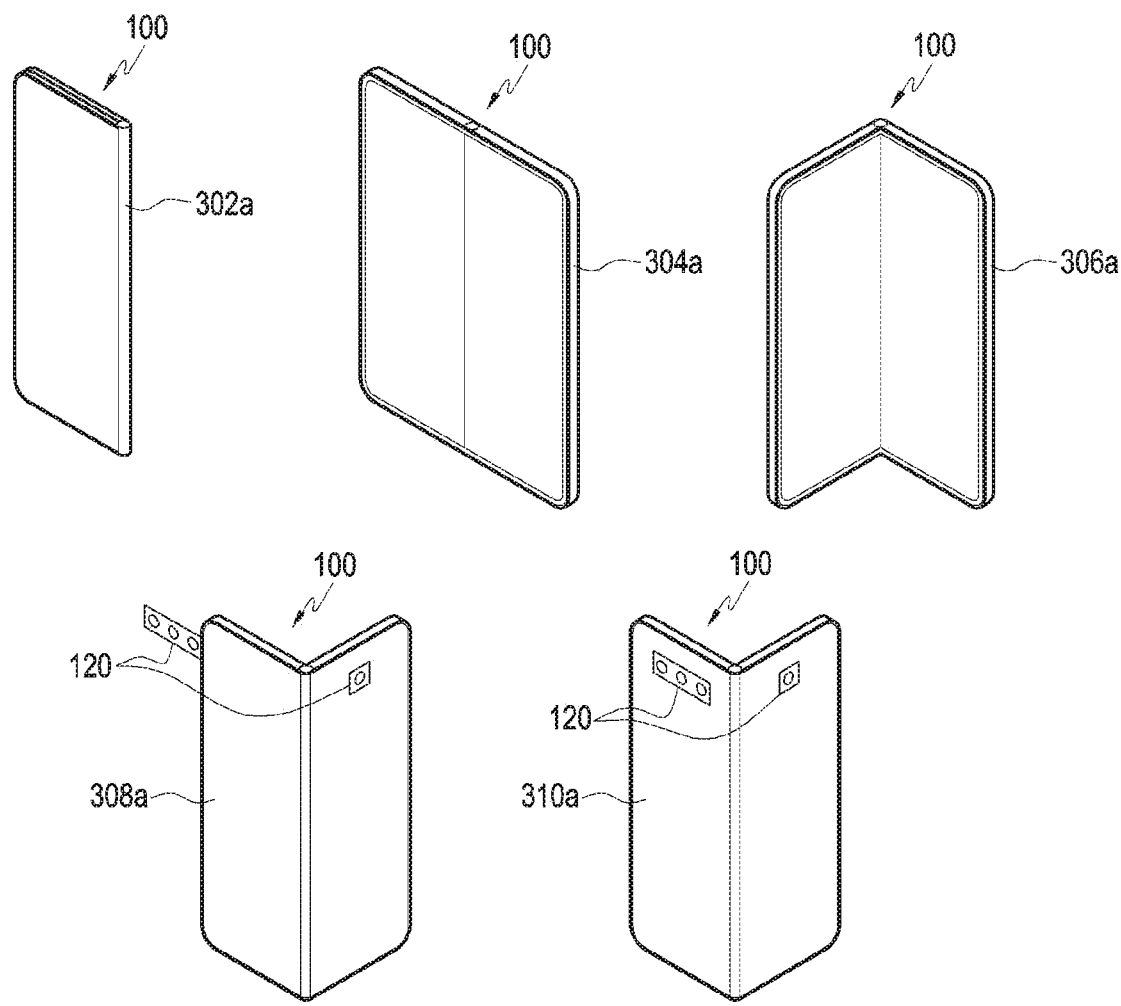
FIGS. 3A and 3B are examples illustrating various types of the bendable device which are used for constructing the 3D data item, according to an embodiment as disclosed herein.
Figure 3B:
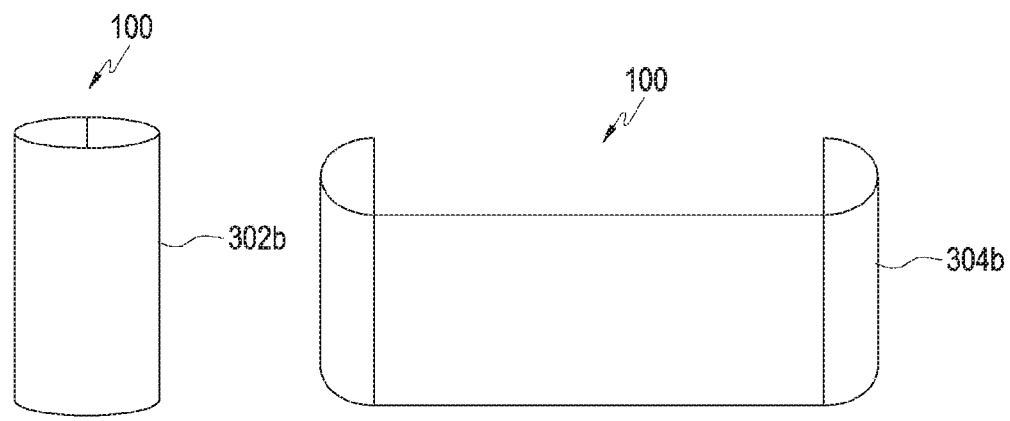

FIGS. 3A and 3B are examples illustrating the various types of bendable device (100) which are used for constructing the 3D data item, according to an embodiment as disclosed herein.

Consider the bendable device (100) includes at least two foldable displays, a mechanical hinge along an axis of the at least two foldable display which enables the folding of the at least two foldable display around the axis, as shown in 302a-306a of the FIG. 3A.

At 302a, the bendable device (100) is in a closed state where the at least two foldable display are folded around the axis. At 302a, the bendable device (100) makes an angle of 180° between the at least two foldable display. At 306a, the bendable device (100) is bent at an angle, which is called the bending angle.

At 308a, the bendable device (100) includes the at least one imaging sensor (120) which are capable of popping-out of the structure of the bendable device (100) when an image needs to be captured. At 310a, the bendable device (100) includes the at least one imaging sensor (120) which are embedded on the body of the bendable device (100) and are used to capture the image.

In another example, the bendable device (100) can be the flexible display which is rollable and foldable, as shown in FIG. 3B. At 302b, the flexible display of the bendable device (100) is rolled completely in the shape of a cylinder. At step 304b, the bendable device (100) is opened up to be flat at the flexible display portion and rolled at the ends.

Figure 4A:
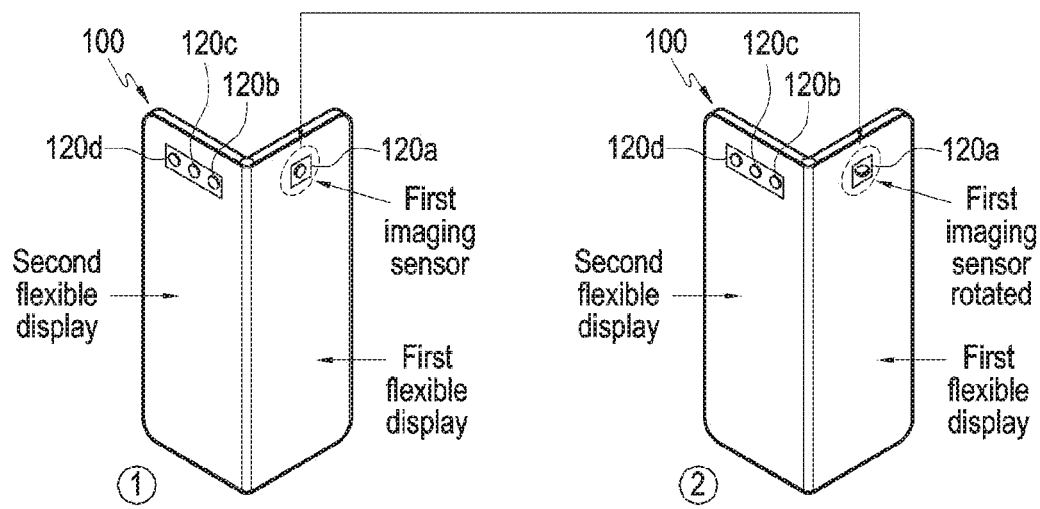
FIGS. 4A and 4B illustrate rotations of at least one imaging sensor of the bendable device for constructing the 3D data item, according to an embodiment as disclosed herein.
Figure 4B:
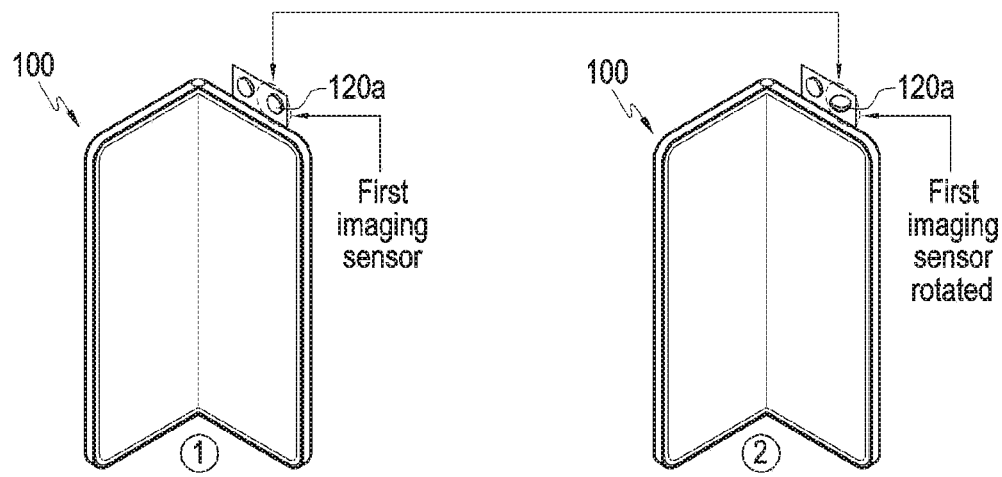

FIGS. 4A and 4B illustrate rotations of the at least one imaging sensor (120) of the bendable device (100) for constructing the 3D data item, according to an embodiment as disclosed herein.

Referring to the FIG. 4A, at 1, Consider a bendable device (100) with two flexible displays connected through a hinge. A first imaging sensor (120a) is provided on a first flexible display of the bendable device (100) and a set of three imaging sensors (120b-120d) is provided on a second flexible display of the bendable device (100).

In an embodiment, when the bendable device (100) determines the shooting mode to be used to construct the 3D data item, the bendable device (100) also determines the position of the first imaging sensor (120a). At 2, the position of the first imaging sensor (120a) is determined to enable the bendable device (100) to capture the scene in the determined shooting mode and construct the 3D data item of the scene.

Referring to the FIG. 4B, in conjunction with the FIG. 4A, in the bendable device (100) the at least one imaging sensor (120a) is provided in a movable pallet attached to the bendable device (100). Further, based on the shooting mode determined by the bendable device (100), the at least one imaging sensor (120a) in the movable pallet is rotated to construct the 3D data item.

The at least one imaging sensor (120a) is mounted in a containing space of the bendable device (100) in a rotatable mode along with a locking module. The rotatable mode enables the at least one imaging sensor (120a) to turn over automatically after being released from the locking module. Therefore, the at least one imaging sensor (120a) is multi-functional and can be rotated to any angle to capture the scene, as shown in the FIG. 4A and the FIG. 4B. In the proposed method, the at least one imaging sensor (120a) which is rotatable provides enhanced depth while capturing the scene.

Figure 5A:
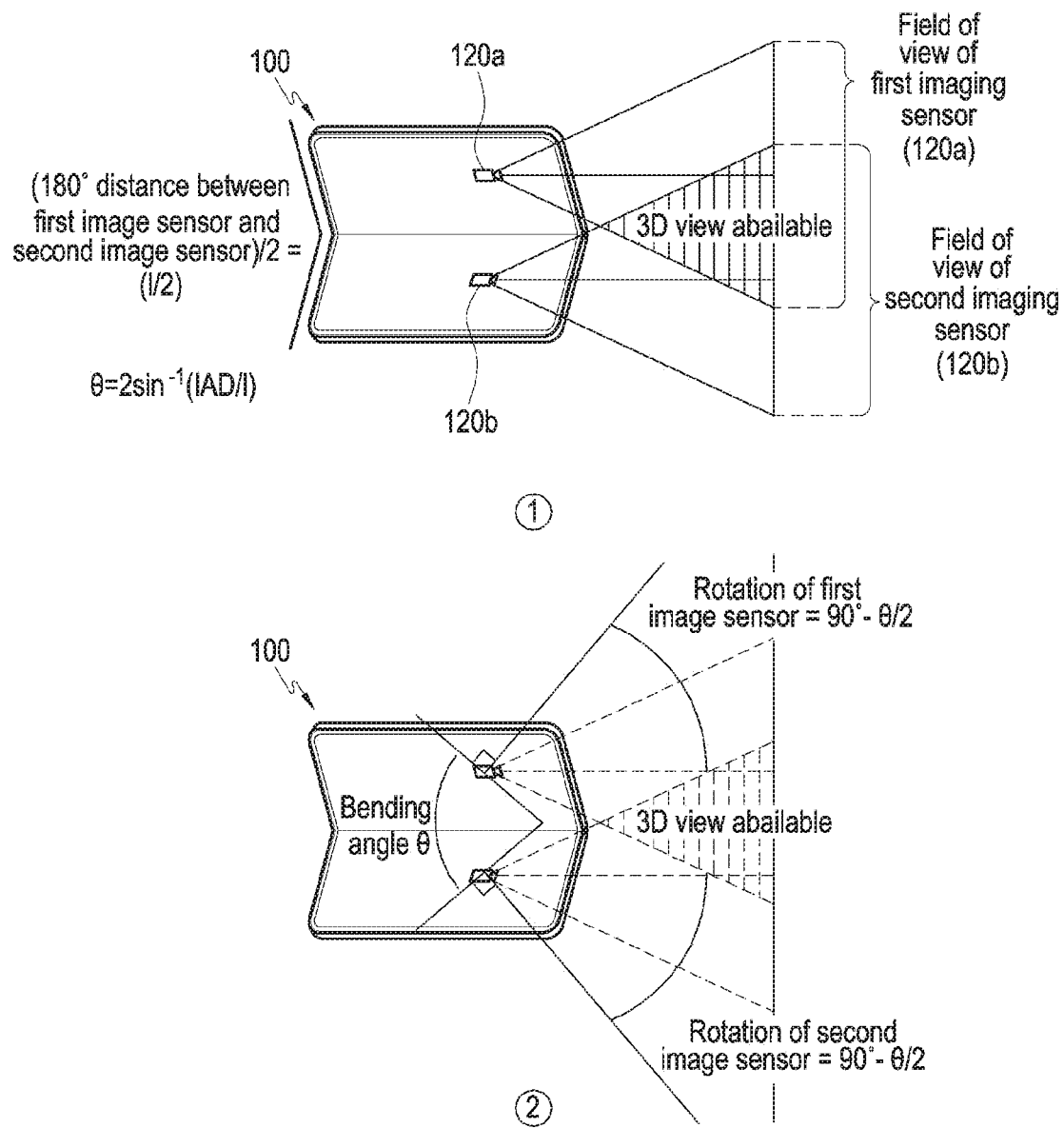
FIG. 5A illustrates a method for determining a position of the at least one imaging sensor of the bendable device for constructing the 3D data item in a parallel shooting mode, according to an embodiment as disclosed herein.

FIG. 5A illustrates a method for determining the position of the at least one imaging sensor (120) of the bendable device (100) for constructing the 3D data item in the parallel shooting mode, according to an embodiment as disclosed herein.

Referring to the FIG. 5A, at 1, consider the bendable device (100) having the first imaging sensor (120a) and the second imaging sensor (120b) which are not rotatable and have a fixed position on the bendable device (100). A field of view of the first imaging sensor (120a) and a field of view of the second imaging sensor (120b) overlap, as shown in the FIG. 5A. A 3D view only of a portion of the scene which falls within the overlapping regions of the field of view of the first imaging sensor (120a) and the field of view of the second imaging sensor (120b) is captured in the parallel shooting mode. The parallel shooting mode is used to capture the 3D view of the far away objects.

However, in the proposed method the bendable device (100) determines the position of the first imaging sensor (120a) and the second imaging sensor (120b) required to capture the 3d view of the scene in the parallel shooting mode. An angle of rotation of the first imaging sensor (120a) and an angle of rotation of the second imaging sensor (120b) is determined based on the bending angle.

$$\text{Angle of rotation of the first imaging sensor } (120a) = 90° - \frac{\theta}{2} \quad (2)$$

$$\text{Angle of rotation of the second imaging sensor } (120b) = 90° - \frac{\theta}{2} \quad (3)$$

where θ is the bending angle.

Further, the bendable device (100) suggests the user to perform a bending action to achieve the bending angle which is required to configure the first imaging sensor (120a) and the second imaging sensor (120b) in the determined position. Therefore, the field of view of the first imaging sensor (120a) and the field of view of the second imaging sensor (120b) capture the 3D view of the scene in the parallel shooting mode, as shown at 2.

Figure 5B:
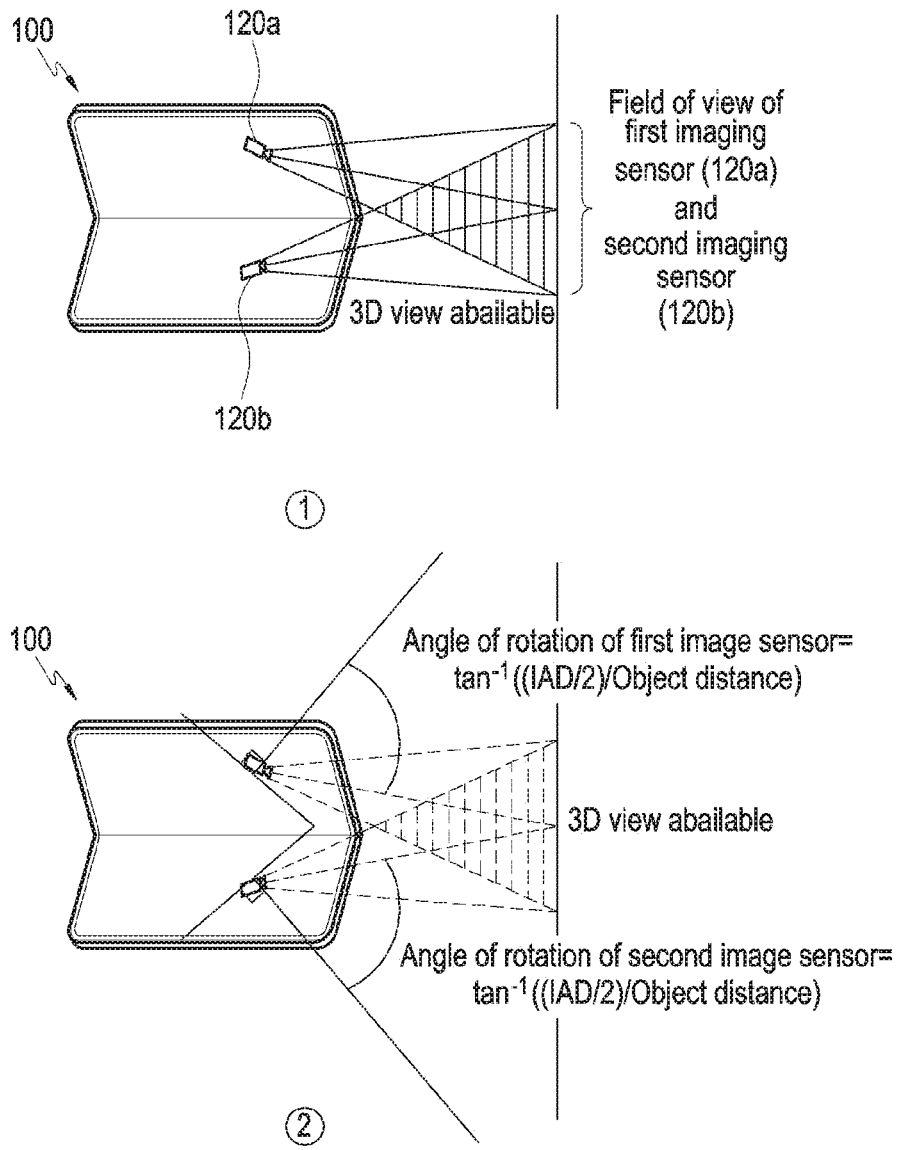
FIG. 5B illustrates a method for determining a position of the at least one imaging sensor of the bendable device for constructing the 3D data item in a converged shooting mode, according to an embodiment as disclosed herein.

FIG. 5B illustrates a method for determining the position of the at least one imaging sensor (120) of the bendable device (100) for constructing the 3D data item in the converged shooting mode, according to an embodiment as disclosed herein.

Referring to the FIG. 5B, at 1, consider the bendable device (100) having the first imaging sensor (120a) and the second imaging sensor (120b) which are not rotatable and have fixed position on the bendable device (100). The field of view of the first imaging sensor (120a) and the field of view of the second imaging sensor (120b) overlap completely, as shown in the FIG. 5B. Therefore, the 3D view of only the portion of the scene which falls within the overlapping regions of the field of view of the first imaging sensor (120a) and the field of view of the second imaging sensor (120b) is captured in the converged shooting mode. The converged shooting mode is used to capture the 3D view of the nearby objects.

However, in the proposed method the bendable device (100) determines the position of the first imaging sensor (120a) and the second imaging sensor (120b) required to capture the 3D view of the scene in the converged shooting mode. The angle of rotation of the first imaging sensor (120a) and the angle of rotation of the second imaging sensor (120b) is determined based on the bending angle.

$$\text{Angle of rotation of the first imaging sensor } (120a) = \tan^{-1}\left[\frac{(IAD/2)}{\text{object distance}}\right] \quad (4)$$

$$\text{Angle of rotation of the second imaging sensor } (120b) = \tan^{-1}\left[\frac{(IAD/2)}{\text{object distance}}\right] \quad (5)$$

Further, the bendable device (100) suggests the user to perform the bending action to achieve the bending angle which is required to configure the first imaging sensor (120a) and the second imaging sensor (120b) in the determined position. Therefore, the field of view of the first imaging sensor (120a) and the field of view of the second imaging sensor (120b) capture the 3D view of the scene in the converged shooting mode, as shown at 2.

Figure 6A:
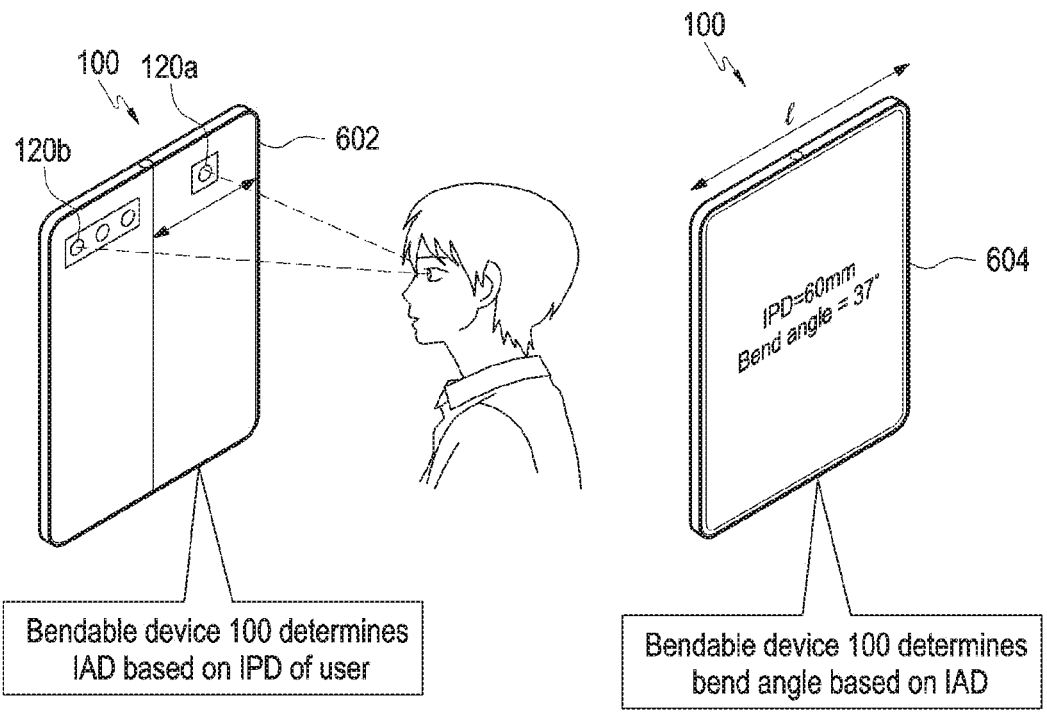
FIGS. 6A and 6B are examples illustrating the construction of the 3D data item using the bending angle of the bendable device for the user, according to an embodiment as disclosed herein.
Figure 6A:
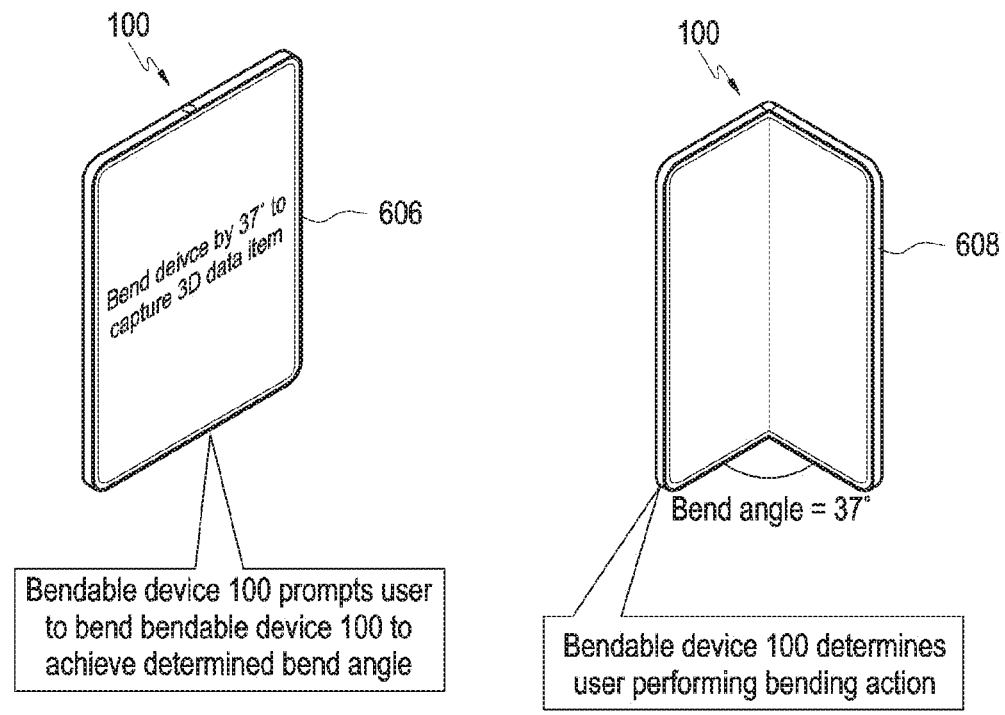
Figure 6B:
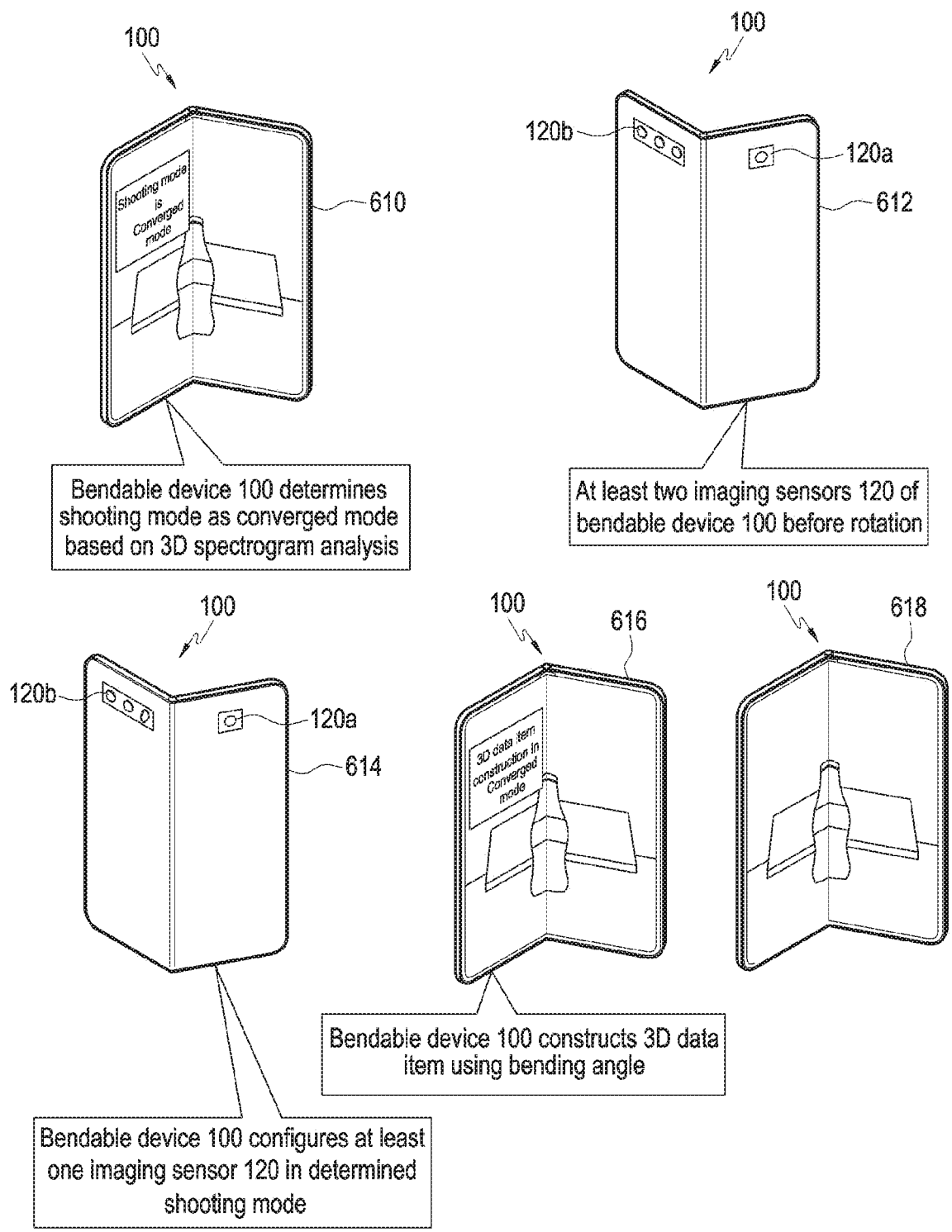

FIGS. 6A and 6B are examples illustrating the construction of the 3D data item using the bending angle of the bendable device (100) for the user, according to an embodiment as disclosed herein.

Referring to the FIG. 6A, at step 602, the bendable device (100) determines the inter-pupillary distance (IPD) of the user as 60 mm. Further, the bendable device (100) determines the inter-axial distance (IAD) between the at least two imaging sensors (120a, 120b) of the bendable device (100) based on the IPD of the user of the bendable device (100). At step 604, the bendable device (100) determines the bending angle as 37-based on the IAD and the length (1/2) of the bendable device (100) across the axis of the bendable device (100).

At step 606, the bendable device (100) displays a message on the screen of the bendable device (100) to prompt the user to bend the bendable device 100 to achieve the determined bending angle of 37°.

At step 608, the bendable device (100) determines the bending action performed by the user to achieve the bending angle of 37°. At step 610, the bendable device (100) performs the 3D spectrogram analysis by correlating the scene within the field of view of the at least two imaging sensors (120a, 120b) and the distance from the at least two imaging sensor (120a, 120b) to the object. Further, the bendable device (100) determines the shooting mode based on the 3D spectrogram analysis as the converged mode. At step 612, the bendable device (100) selects the first imaging sensors (120*a*) and the second imaging sensors (120*b*); and determines the position of the first imaging sensors (120*a*) and the second imaging sensors (120*b*) for constructing the 3D data item using the bending angle.

At step 614, the bendable device (100) configures the first imaging sensors (120*a*) and the second imaging sensors (120*b*) in the converged shooting mode and the determined position. The configuration of the second imaging sensors (120*b*) in the determined position includes rotation of the second imaging sensors (120*b*), as shown in FIG. 6B.

Further, at step 616, the bendable device (100) constructs the 3D data item using the bending angle of the bendable device (100) which is displayed at step 618.

Figure 7A:
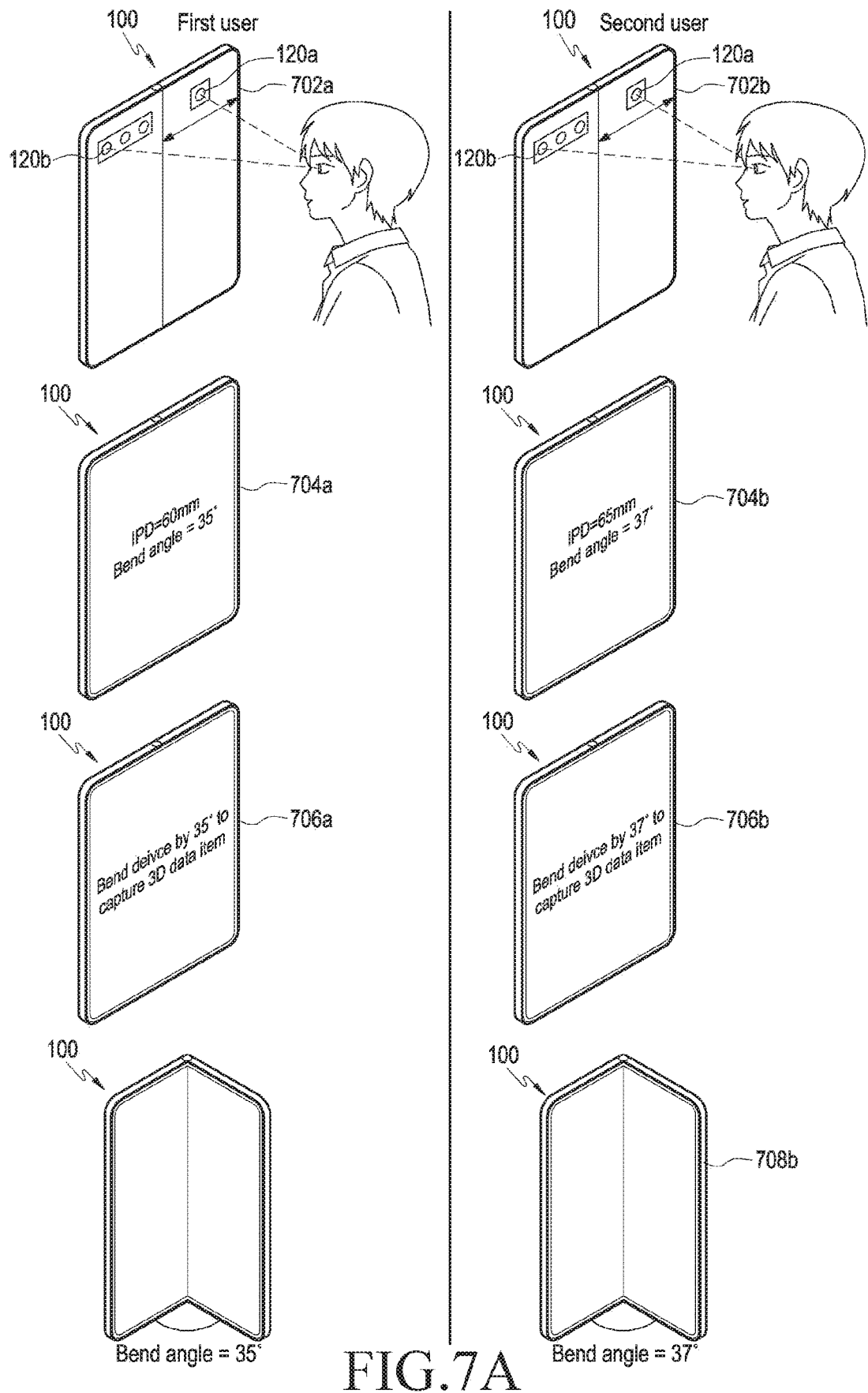
FIGS. 7A and 7B are examples illustrating the construction of the 3D data item using the bending angle of the bendable device by selecting a shooting mode based on an inter-pupillary distance (IPD) of different users, according to an embodiment as disclosed herein.

FIG. 7A is an example illustrating the construction of the 3D data item using the bending angle of the bendable device (100) by selecting the shooting mode based on the IPD of the different users, according to an embodiment as disclosed herein.

Consider a first user using the bendable device (100) to construct the 3D data item based on the IPD of the first user. Also, consider a second user using the bendable device (100) to construct the 3D data item based on the IPD of the second user.

Referring to the FIG. 7A, at step 702*a*, the bendable device (100) determines the IPD of the first user as 60 mm. At step 702*b*, the bendable device (100) determines the IPD of the second user as 65 mm. Further, the bendable device (100) determines the IAD based on the IPD of the respective users of the bendable device (100). At step 704*a*, the bendable device (100) determines the bending angle as 35° for the first user based on the IAD of the first user. Similarly, at step 704*b*, the bendable device (100) determines the bending angle as 37° for the second user based on the IAD of the second user.

At step 706*a*, the bendable device (100) displays a message on the screen of the bendable device (100) to prompt the first user to bend the bendable device 100 to achieve the determined bending angle of 35°. At step 706*b*, bendable device (100) prompts the second user to bend the bendable device 100 to achieve the determined bending angle of 37°.

At step 708*a* and step 708*b*, the bendable device (100) determines the bending action performed by the first user to achieve the bending angle of 35° and the bending action performed by the second user to achieve the bending angle of 37°, respectively.

Figure 7B:
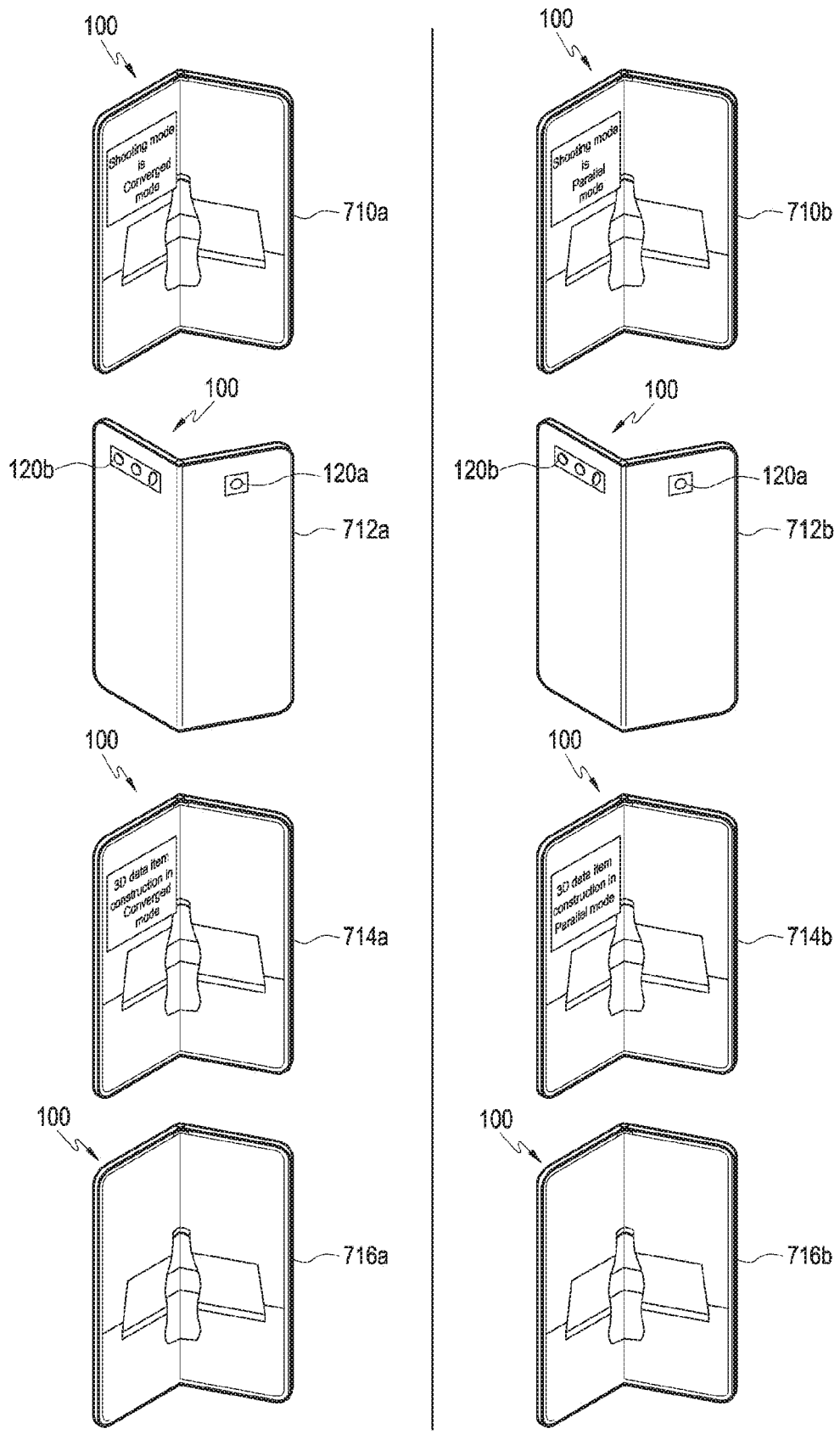

Referring to FIG. 7B, at step 710*a* and step 710*b*, the bendable device (100) determines the shooting mode to be used for constructing the 3D view of the scene based on the 3D spectrogram analysis for the first user is converged mode and the second user is parallel mode respectively. At step 712*a*, the bendable device (100) selects the first imaging sensors (120*a*) and the second imaging sensors (120*b*) and determines the position of the first imaging sensors (120*a*) and the second imaging sensors (120*b*) for constructing the 3D data item using the bending angle for the first user. Further, the bendable device (100) configures the first imaging sensor (120*a*) and the second imaging sensor (120*b*) in the converged shooting mode and the determined position based on the bending angle for the first user, as shown in FIG. 7B.

Similarly, at step 712*b*, the bendable device (100) selects the first imaging sensors (120*a*) and the second imaging sensors (120*b*) and determines the position of the first imaging sensors (120*a*) and the second imaging sensors (120*b*) for constructing the 3D data item using the bending angle for the second user. Further, the bendable device (100) configures the first imaging sensor (120*a*) and the second imaging sensor (120*b*) in the parallel shooting mode and the determined position based on the bending angle for the second user, as shown in FIG. 7A.

Further, at step 716*a*, the bendable device (100) constructs the 3D data item using the bending angle for the first user and at step 716*b*, the bendable device (100) constructs the 3D data item using the bending angle for the second user.

Therefore, in the conventional methods and systems the bendable device (100) does not use a default shooting mode for the plurality of users who use the bendable device (100). Unlike to the conventional methods and systems, in the proposed method the bendable device (100) determines the best shooting mode to construct the 3D data item based on the IPD of the individual user.

Figure 8A:
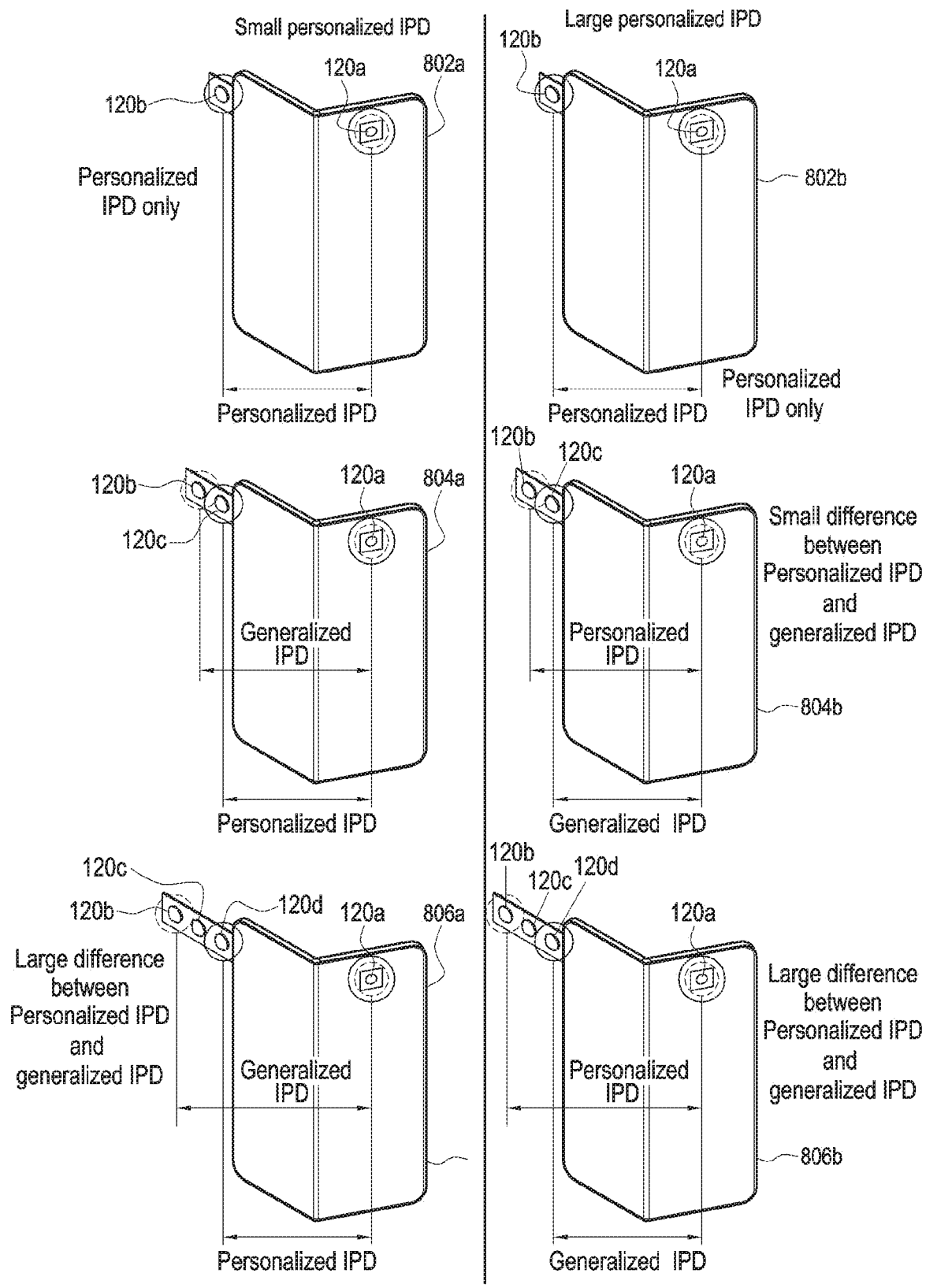
FIG. 8A is an example illustrating a varying degree of pop-up of the at least one imaging sensor based on a personalized IPD of the user and a generalized IPD of a plurality of users of the bendable device, according to an embodiment as disclosed herein.

FIG. 8A is an example illustrating the varying degree of pop-up of the at least one imaging sensor (120) based on the personalized IPD of the user and the generalized IPD of the plurality of user of the bendable device (100), according to an embodiment as disclosed herein.

Referring to the FIG. 8A, consider that the personalized IPD for a user is a smaller than the generalized IPD. Consider that the bendable device (100) has four imaging sensors (120*a*-120*d*) where the second imaging sensor (120*b*), the third imaging sensor (120*c*) and the fourth imaging sensor (120*d*) are popping-capable imaging sensors. Further, the first imaging sensor (120*a*) is the fixed imaging sensor on the first display of the bendable device (100). The fourth imaging sensor (120*d*) is closest to the first imaging sensor (120*a*) and the second imaging sensor (120*b*) is farthest from the first imaging sensor (120*a*).

At 802*a*, the bendable device (100) determines the personalized IPD for the user using the at least one imaging sensor (120*a*). Further, based on the personalized IPD of the user, the bendable device (100) pops-up the second imaging sensor (120*b*).

At 804*a*, the bendable device (100) determines the personalized IPD for the user using the at least one imaging sensor (120) and compares the personalized IPD for the user with the generalized IPD for the plurality of users which is stored in the bendable device (100). The bendable device (100) determines that the difference between the personalized IPD and the generalized IPD are negligible. Further, the bendable device (100) pops-out the second imaging sensor (120*b*) and the third imaging sensor (120*c*) to capture the 3D data item using the personalized IPD and the generalized IPD. Since the personalized IPD is smaller than the generalized IPD, the bendable device (100) uses the first imaging sensor (120*a*) and the second imaging sensor (120*b*) to construct the 3D data item using the generalized IPD. Further, the bendable device (100) uses the first imaging sensor (120*a*) and the third imaging sensor (120*c*) to construct the 3D data item using the personalized IPD.

Similarly at 806*a*, the bendable device (100) determines that the difference between the personalized IPD and the generalized IPD are very large. Further, the bendable device (100) pops-out the second imaging sensor (120*b*), the third imaging sensor (120*c*) and the fourth imaging sensor (120*d*) to capture the 3D data item using the personalized IPD and the generalized IPD. Since the personalized IPD is smaller than the generalized IPD, the bendable device (100) uses the first imaging sensor (120*a*) and the second imaging sensor (120*b*) to construct the 3D data item using the generalized IPD. Further, the bendable device (100) uses the first imaging sensor (120*a*) and the fourth imaging sensor (120*d*) to construct the 3D data item using the personalized IPD.

Figure 8B:
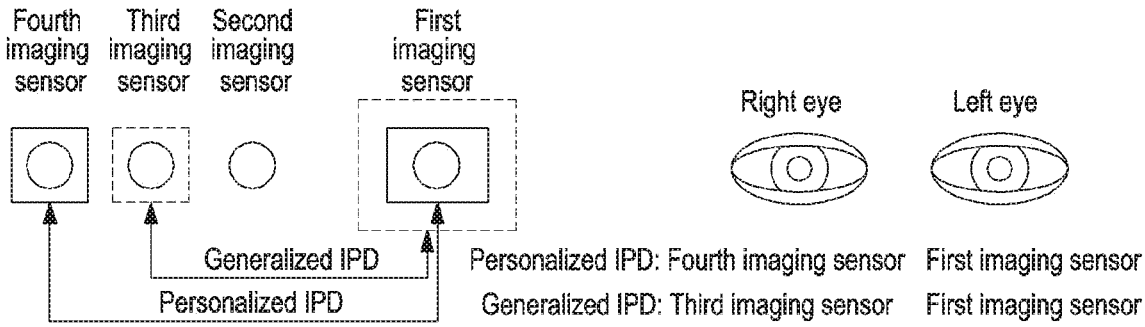
FIG. 8B is an example illustrating a selection of at least two imaging sensors based on the personalized IPD of the user and the generalized IPD of the plurality of users of the bendable device, according to an embodiment as disclosed herein.
Figure 8B:
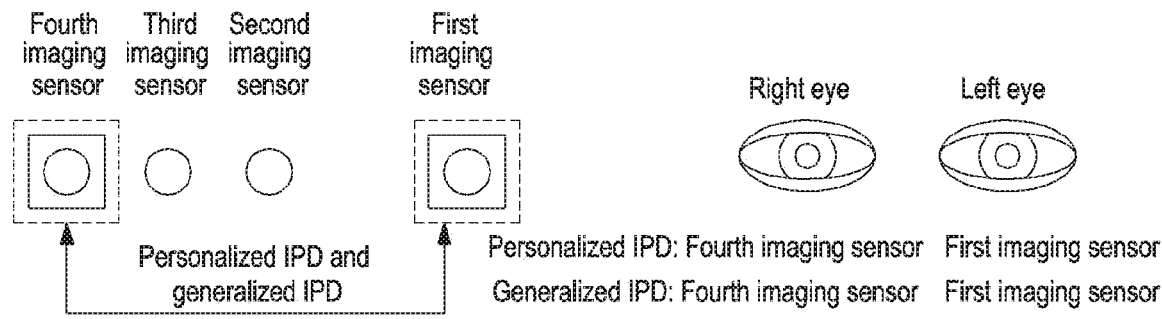
Figure 8B:
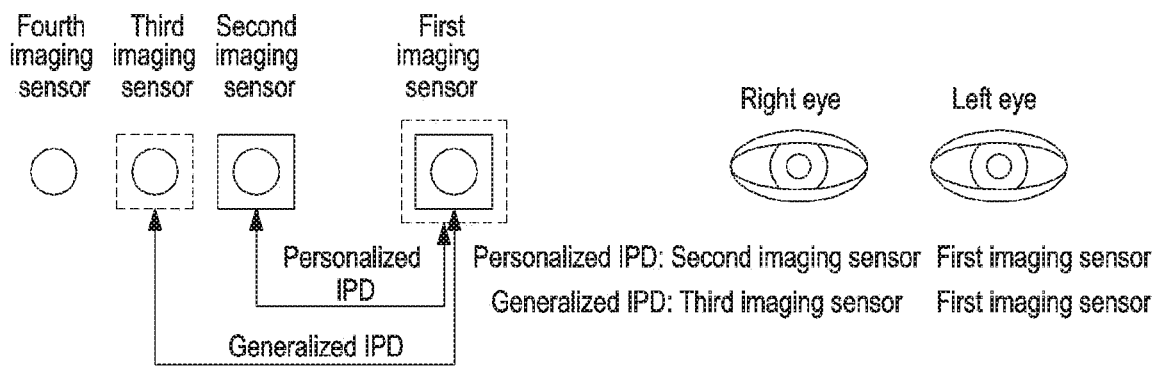

FIG. 8B is an example illustrating the selection of the at least two imaging sensor (120) based on the personalized IPD of the user and the generalized IPD of the plurality of users of the bendable device (100), according to an embodiment as disclosed herein.

Referring to the FIG. 8B in conjunction with the FIG. 8A, consider a case 1, where the personalized IPD of the user is large and the personalized IPD of the user is greater than the generalized IPD. The farthest imaging sensors (i.e., the first imaging sensor (120a) and the fourth imaging sensor (120d)) are chosen for constructing the 3D view of the scene using the personalized IPD. The imaging sensors which are closer to each other (i.e., the first imaging sensor (120a) and the third imaging sensor (120c)) are chosen for constructing the 3D view of the scene using the generalized IPD.

In a case 2, the personalized IPD of the user is equal to the generalized IPD. The farthest imaging sensors (i.e., the first imaging sensor (120a) and the fourth imaging sensor (120d)) are chosen for constructing the 3D view of the scene using the personalized IPD and the generalized IPD. Further, the farthest imaging sensors provide maximum range.

In a case 3, a case 1, where the personalized IPD of the user is small and the generalized IPD is greater than the personalized IPD of the user. The farthest imaging sensors (i.e., the first imaging sensor (120a) and the third imaging sensor (120c)) are chosen for constructing the 3D view of the scene using the generalized IPD. The imaging sensors which are closer to each other (i.e., the first imaging sensor (120a) and the second imaging sensor (120b)) are chosen for constructing the 3D view of the scene using the personalized IPD.

Figure 8C:
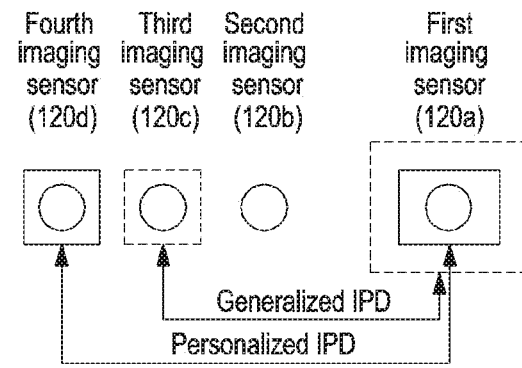
FIG. 8C illustrates a construction of a video of the 3D data item based on a plurality of frames from the at least two imaging sensors of the bendable device, according to an embodiment as disclosed herein.
Figure 8C:
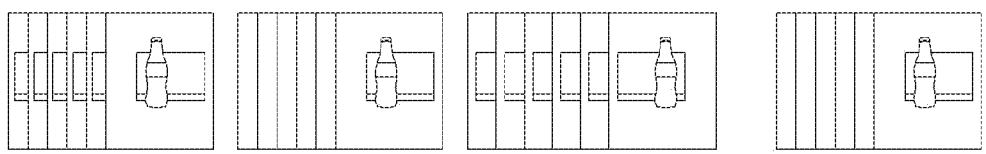
Figure 8C:
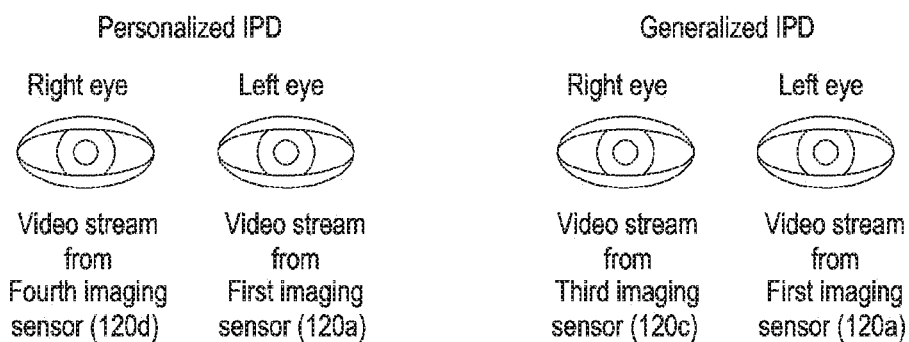

FIG. 8C illustrates the construction of a video of the 3D data item based on a plurality of frames from the at least two imaging sensor (120) of the bendable device (100), according to an embodiment as disclosed herein.

Referring to the FIG. 8C, the bendable device (100) can capture the video of the 3D data item with the personalized IPD and the generalized IPD simultaneously and store in a MPEG format in the bendable device (100). Further, two separate imaging sensors of the at least one imaging sensor (120) are used to capture the frames with respect to each eye of the user, which are then packaged in a single file as a stereoscopic 3D recording. The MPEG format is used to store the two videos as the MPEG format supports saving the stereoscopic 3D video in a side-by-side video format.

For example, consider a first user with personalized IPD as IPD 1. The video frames from the first imaging sensor (120a) corresponding to the first eye of the first user and the video frames from the second imaging sensor (120b) corresponding to the second eye of the first user are stored as the stereoscopic 3D video called file 1. Similarly, the file 2 corresponds to the stereoscopic 3D video for the second user which is captured using the first imaging sensor (120a) and the third imaging sensor (120c). Also, the file 3 corresponds to the stereoscopic 3D video for the third user which is captured using the first imaging sensor (120a) and the fourth imaging sensor (120d), as shown in FIG. 8C.

Further, the bendable device (100) also simultaneously records the stereoscopic 3D video using the generalized IPD every time the stereoscopic 3D video is recorded using the personalized IPD of the respective users. The generalized IPD is an average of the personalized IPDs of the individual users i.e., Generalized IPD=Avg(personalized IPD for first user+personalized IPD for second user+personalized IPD for third user).

Figure 9:
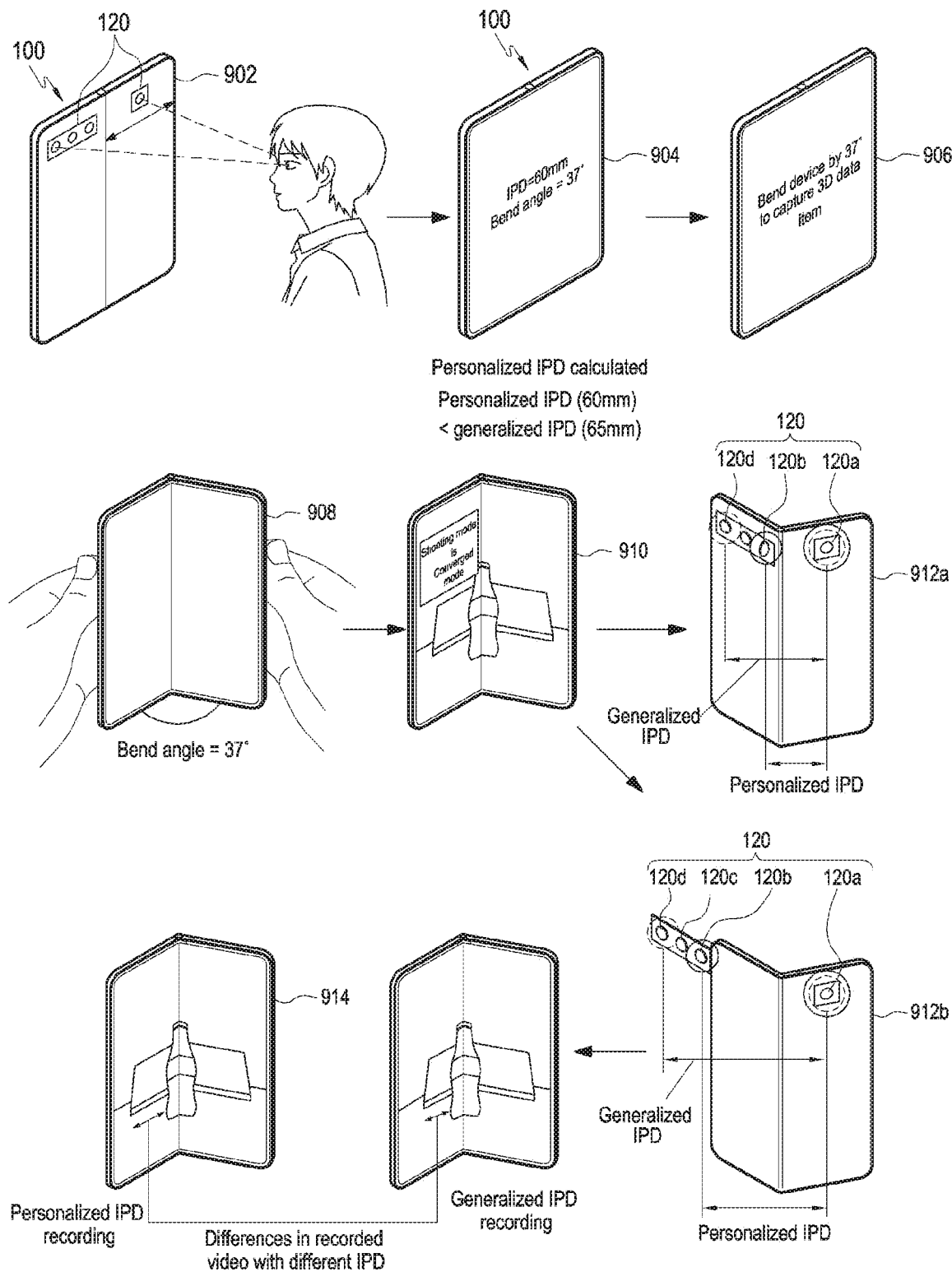
FIG. 9 is an example illustrating the construction of the 3D data item simultaneously based on the personalized IPD and the generalized IPD, according to an embodiment as disclosed herein.

FIG. 9 is an example illustrating the construction of the 3D data item simultaneously based on the personalized IPD and the generalized IPD, according to an embodiment as disclosed herein.

Referring to the FIG. 9, at step 902, the bendable device (100) determines the personalized IPD for the user as 60 mm. At step 904, the bendable device (100) determines the bending angle based on the personalized IPD. Further, the bendable device (100) also compares the personalized IPD with the generalized IPD (i.e., 65 mm) and determines that the personalized IPD is less than the generalized IPD.

At step 906, the bendable device (100) displays a message on the screen of the bendable device (100), prompting the user to perform the bending action to achieve the bending angle of 37°. At step 908, the user bends the bendable device (100) to the bending angle. At step 910, the bendable device (100) determines the shooting mode as the converged shooting mode based on the 3D spectrogram analysis. Further, the bendable device (100) determines the position of the at least one imaging sensors (120) and configures the at least two imaging sensors (120) in the determined position.

At step 912a, the bendable device (100) includes the at least two imaging sensors (120) which are fixed. The bendable device (100) configures the at least two imaging sensors (120) by rotating the second imaging sensor (120b). Further, the bendable device (100) constructs the 3D data item based on the personalized IPD using the first imaging sensor (120a) and the second imaging sensor (120b). The bendable device (100) also simultaneously constructs the 3D data item based on the generalized IPD using the first imaging sensor (120a) and the fourth imaging sensor (120d).

In another example, consider that the bendable device (100) includes the at least two imaging sensors (120) which can be popped-out. At step 912b, the bendable device (100) configures the at least two imaging sensors (120) by popping-out the second imaging sensor (120b), the third imaging sensor (120c) and the fourth imaging sensor (120d). Further, the bendable device (100) constructs the 3D data item based on the personalized IPD using the first imaging sensor (120a) and the second imaging sensor (120b). The bendable device (100) also simultaneously constructs the 3D data item based on the generalized IPD using the first imaging sensor (120a) and the fourth imaging sensor (120d).

At step 914, the bendable device (100) constructs the 3D data item based on the generalized IPD and the personalized IPD of the user simultaneously. Further, the differences between the 3D data item constructed based on the generalized IPD and the personalized IPD of the user are clearly shown in FIG. 9. Therefore, the proposed method provides personalized construction of the 3D data item for the specific users and also the generalized construction of the 3D data item, which can be shared/viewed by different users.

Figure 10:
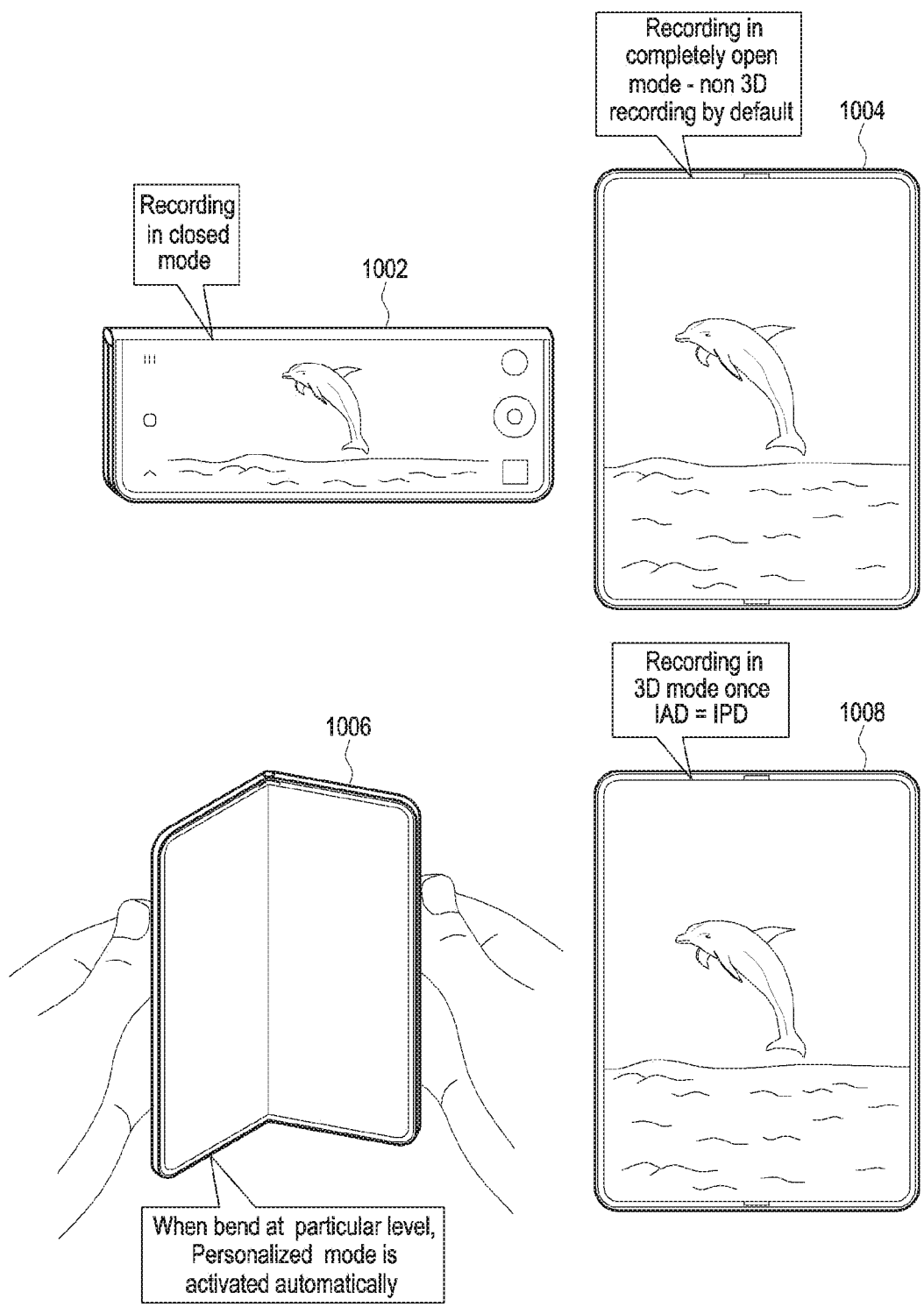
FIG. 10 illustrates an example scenario where the bendable device automatically records a scene in a 3D mode when the user bends the bendable device to a specific angle, according to an embodiment as disclosed herein.

FIG. 10 illustrates an example scenario where the bendable device (100) automatically records the scene in the 3D mode when the user bends the bendable device (100) to a specific angle, according to an embodiment as disclosed herein.

Referring to the FIG. 10, at step 1002, consider that the user of the bendable device (100) is recording a video in a closed mode i.e., the first flexible display and the second flexible display of the bendable device (100) are folded onto each other. Further, at step 1004, the user records the video in a completely open mode i.e., the first flexible display and the second flexible display of the bendable device (100) are opened-up and are at 180- to each other. However, the completely open mode is a non 3D recording by default and the video is recorded in the non-3D recording mode.

At step 1006, the user performs the bending action on the bendable device (100). At a specific instance of time, the IAD of the bendable device (100) becomes equal to the IPD of the user of the bendable device (100). When the IAD of the bendable device (100) becomes equal to the IPD of the user, the bendable device (100) automatically records the scene in the 3D mode, as shown in step 1008. However, the user of the bendable device (100) can manually switch to the non 3D recording, in case the user does not want to record the video in the 3D mode.

Therefore, the bendable device (100) continuously compares the IAD of the bendable device (100) with the IPD of the user, and automatically switches to record the scene in the 3D mode, when the IAD of the bendable device (100) becomes equal to the IPD of the user.

Figure 11A:
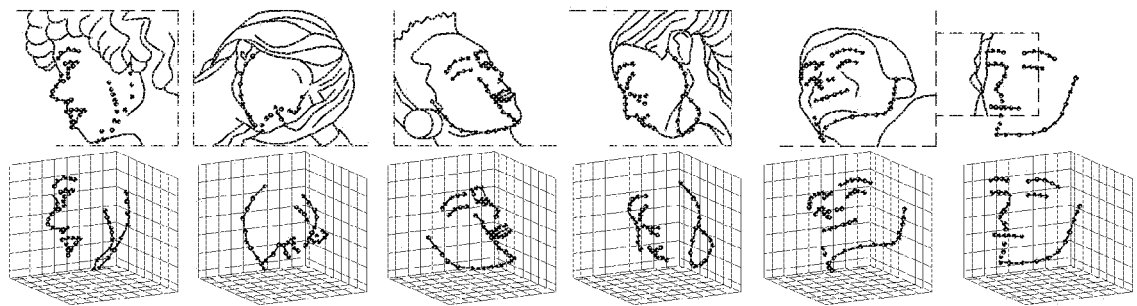
FIGS. 11A and 11B illustrate examples of constructing a selfie image of the user of the bendable device based on an image captured in the 3D mode, according to an embodiment as disclosed herein.
Figure 11B:
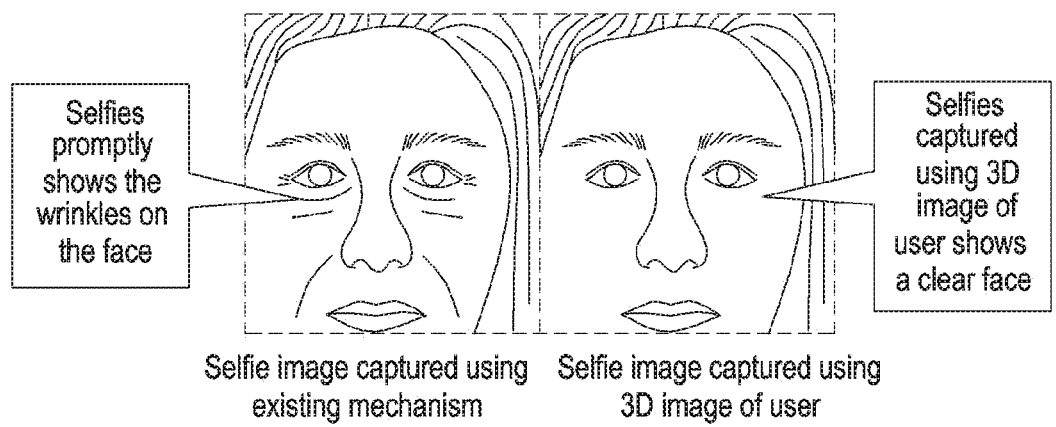

FIGS. 11A and 11B illustrate examples of constructing a selfie image of the user of the bendable device (100) based on an image captured in the 3D mode, according to an embodiment as disclosed herein.

A better selfie image of the user can be obtained if the selfie image is captured in the 3D mode. The image captured in the 3D mode provides a larger number of points for constructing the image of the user. Hence, the bendable device (100) will capture the selfie image by removing abnormalities from face of the user, which are recognized in the 3D mode. Referring to the FIG. 11A, initially the bendable device (100) captures the image of the user in the 3D mode. The image captured in the 3D mode is analyzed and all abnormalities, spots and depth of eye bags are predefined and noted by the bendable device (100). Further, while the user captures the selfie in real-time, a better selfie is provided, as shown in FIG. 11B.

A simplify 3D (S3D) view along with variable inter-axial distance and convergence provides the bendable device (100) with more information about the user (i.e., the user whose image is captured) than a single image.

Figure 12A:
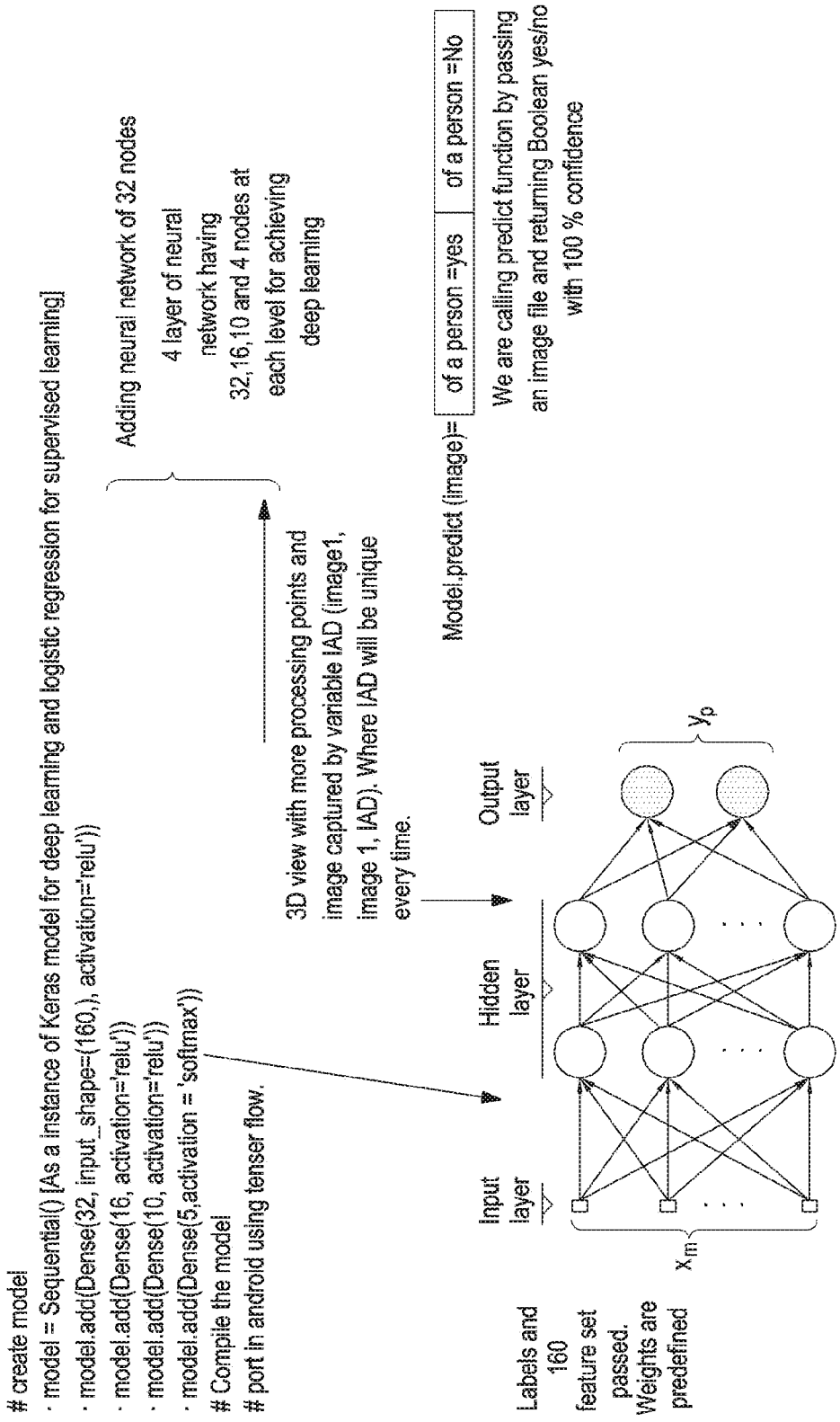
FIG. 12A illustrates a deep learning network based model providing enhanced security to the bendable device, according to an embodiment as disclosed herein.

FIG. 12A illustrates a deep learning network based model providing enhanced security to the bendable device (100), according to an embodiment as disclosed herein.

Referring to the FIG. 12A, the bendable device (100) includes a 4 layer deep learning network and which is trained for better security. The 4 layer deep learning network which is used in the bendable device (100) provides enhanced security due to the availability of the plurality of facial points in the 3D image due to increased depth. Therefore, the proposed bendable device (100) provides enhanced secure face unlocking mechanism. In an example, consider an input_shape=(160) which represents the number of facial points that are used by the 4 layer deep learning network. Further, classifier functions are used in the 4 layer deep learning network for predicting an output. Further, the bendable device (100) uses a soft max classifier for training and retraining of the 4 layer deep learning network.

Figure 12B:
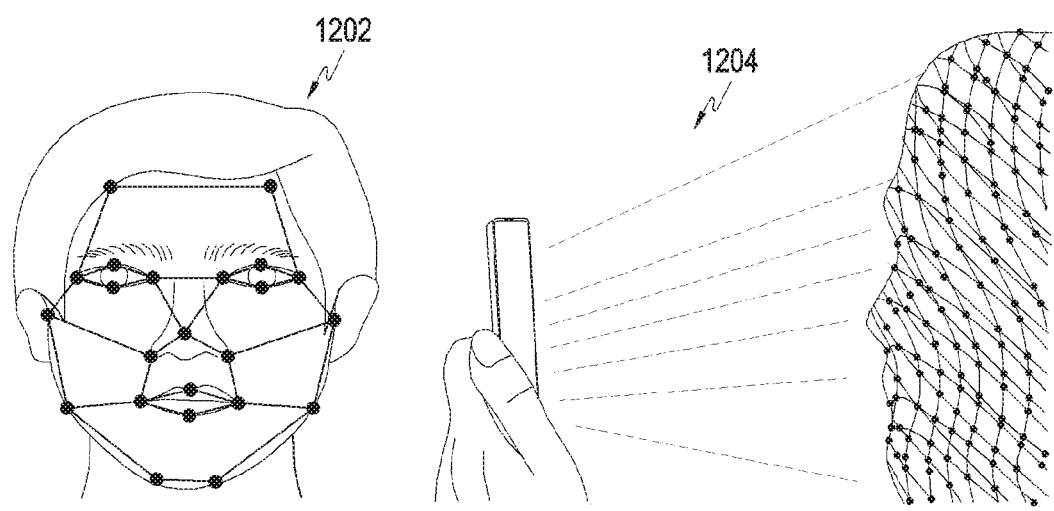
FIG. 12B is an example illustrating enhanced security feature in the bendable device based on deep learning, according to an embodiment as disclosed herein.

FIG. 12B is an example illustrating enhanced security feature in the bendable device (100) based on deep learning, according to an embodiment as disclosed herein.

Referring to the FIG. 12B, at 1202, an existing two dimensional (2D) face image which is used for facial recognition to unlock the bendable device (100) is shown. The existing 2D technique captures about 23 points from the user's face to construct the information about the user to unlock the phone.

At 1204, the proposed deep learning technique which uses the 3D image for facial recognition is shown. The proposed deep learning technique captures more than 4000 points from the user's face to construct the information about the user to unlock the phone. Further, the proposed deep learning technique enables the bendable device (100) to use two images from a variable IAD to match the 3D Model. The use of the variable IAD will assure that no two images can hack the bendable device (100) any time.

Figure 13:
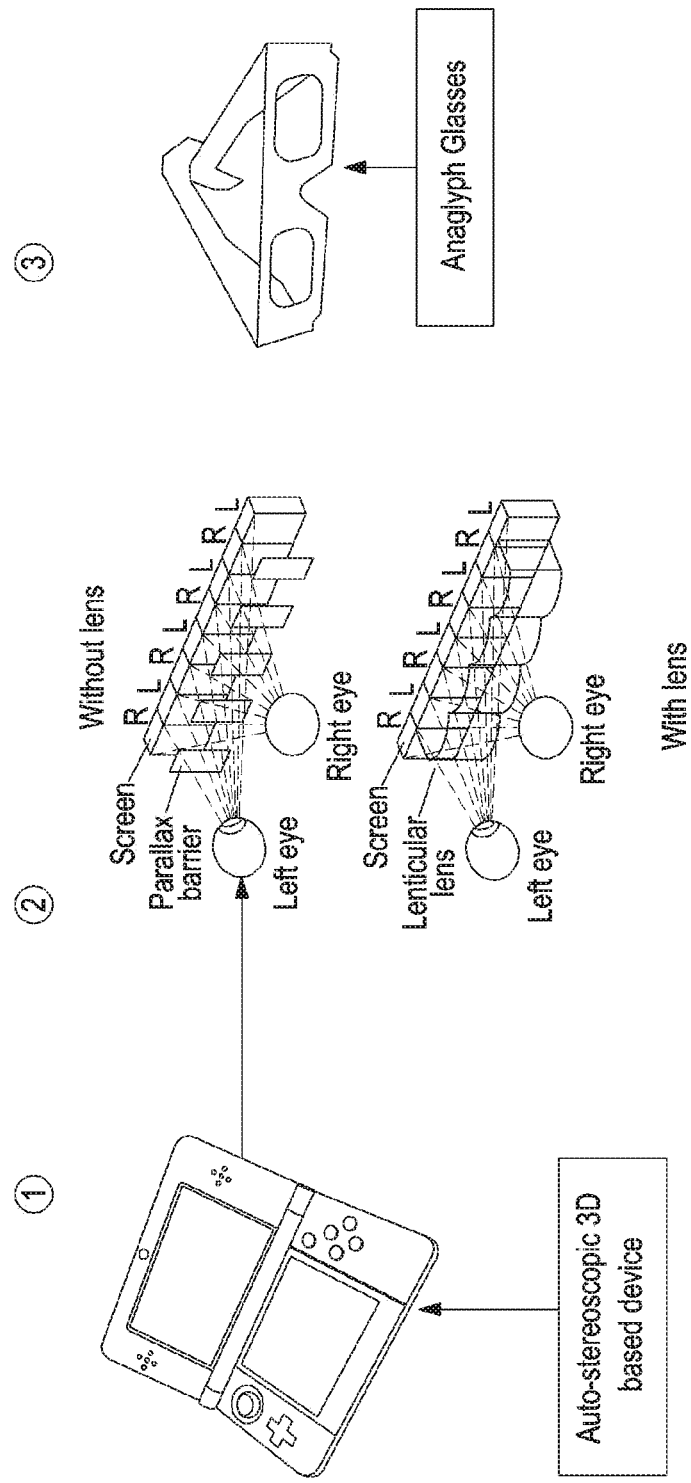
FIG. 13 illustrates existing approaches of displaying the 3D data item.

FIG. 13 illustrates existing approaches of displaying the 3D data item, according to prior art.

Conventional methods of creating the 3D data items include an auto-stereoscopy technology which includes displaying stereoscopic images without the use of special headgear or 3D glasses on the part of the user, as shown in 1.

In another conventional method flat-panel displays use lenticular lenses or parallax barriers that redirect imagery to several viewing regions, as shown in 2. The parallax barrier is a device placed in front of the flat-panel displays to provide the stereoscopic image or multi-scopic image without the need for the viewer to wear the 3D glasses. Similarly, the lenticular lenses can also be used at the image source of the flat-panel displays to provide the stereoscopic images.

Generally, polarized 3D technology also displays images on a single screen, but uses a polarizer on both the image source and glasses, to create two different images for each eye of the user. The polarized 3D technology includes two ways of polarization i.e., circular polarization and linear polarization. Conventional 3D devices include circular polarized glasses (e.g., anaglyph glasses, as shown in 3) and linearly polarized glasses. Further, in the linear polarized glasses there is no animation of the scene. Two lights from the scene being captured passes through one lens exclusively of the linearly polarized glasses.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for constructing a three dimensional (3D) data item in a bendable device, the method comprising:
   determining, by the bendable device, an inter-axial distance between at least two imaging sensors of the bendable device based on a biometric associated with eyes of a user;
   determining, by the bendable device, a bending angle of the bendable device based on the inter-axial distance; and
   constructing, by the bendable device, the 3D data item using the bending angle of the bendable device,
   wherein the bending angle is determined using the inter-axial distance and a length of the bendable device across an axis of the bendable device.

2. The method of claim 1, wherein the constructing, by the bendable device, the 3D data item using the bending angle of the bendable device comprises:
  detecting a bending action performed by the user to achieve the determined bending angle;
  performing a 3D spectrogram analysis by correlating a scene within a field of view of the at least two imaging sensors and a distance from the at least two imaging sensors;
  determining a shooting mode based on the 3D spectrogram analysis;
  selecting the at least two imaging sensors for constructing the 3D data item using the bending angle;
  configuring the at least two imaging sensors in the determined shooting mode; and
  constructing the 3D data item using the bending angle of the bendable device.

3. The method of claim 2, wherein the shooting mode is at least one of a parallel shooting or a converged shooting.

4. The method of claim 2, further comprising:
  determining, by the bendable device, positions of the at least two imaging sensors;
  configuring, by the bendable device, the at least two imaging sensors in the determined positions; and
  constructing, by the bendable device, the 3D data item using the bending angle of the bendable device.

5. The method of claim 4, wherein determining, by the bendable device, the positions of the at least two imaging sensors comprises:
  performing at least one of a rotation of the at least two imaging sensors, popping-up of the at least two imaging sensors from the bendable device, or tilting of the at least two imaging sensors.

6. The method of claim 5, wherein selecting, by the bendable device, the at least two imaging sensors for constructing the 3D data item using the bending angle comprises:
  determining a personalized biometric associated with the eyes of the user, wherein the personalized biometric associated with the eyes is specific to the user;
  identifying the at least two imaging sensors to be used for constructing the 3D data item based on the personalized biometric associated with the eyes of the user and a generalized biometric associated with the eyes for the bendable device, wherein the generalized biometric associated with the eyes is an average of the biometric associated with the eyes of a plurality of users; and
  selecting the at least two imaging sensors for constructing the 3D data item using the bending angle.

7. The method of claim 1, wherein the biometric associated with the eyes is unique to the user of the bendable device,
  wherein the biometric associated with the eyes is determined using the at least two imaging sensors of the bendable device.

8. The method of claim 1, wherein the bendable device further comprises:
  at least two foldable displays; and
  a mechanical hinge along an axis of the at least two foldable displays, the mechanical hinge enabling folding of the at least two foldable display around the axis.

9. The method of claim 1, wherein the bendable device is a flexible display which is rollable and foldable.

10. The method of claim 1, further comprising:
  determining, by the bendable device, the inter-axial distance between the at least two imaging sensors of the bendable device is equal to the biometric associated with the eyes; and
  automatically constructing, by the bendable device, the 3D data item of a scene within a field of view of the at least two imaging sensors using the bending angle of the bendable device.

11. The method of claim 1, wherein the biometric of the eyes is one of an inter-pupillary distance (IPD), an inter-iris distance (IID), or an inter-retinal distance (IRD).

12. A bendable device for constructing a three dimensional (3D) data item, the bendable device comprising:
  a memory;
  at least two imaging sensors; and
  a processor coupled to the memory, the processor configured to:
    determine an inter-axial distance between the at least two imaging sensors of the bendable device based on a biometric associated with eyes of a user;
    determine a bending angle of the bendable device based on the inter-axial distance; and
    construct the 3D data item using the bending angle of the bendable device
  wherein the bending angle is determined using the inter-axial distance and a length of the bendable device across an axis of the bendable device.

13. The bendable device of claim 12, wherein the processor is configured to construct the 3D data item using the bending angle of the bendable device by:
  detecting a bending action performed by the user to achieve the determined bending angle;
  performing a 3D spectrogram analysis by correlating a scene within a field of view of the at least two imaging sensors and a distance from the at least two imaging sensors;
  determining a shooting mode based on the 3D spectrogram analysis;
  selecting the at least two imaging sensors for constructing the 3D data item using the bending angle;
  arranging the at least two imaging sensors in the determined shooting mode; and
  constructing the 3D data item using the bending angle of the bendable device.

14. The bendable device of claim 13, wherein the shooting mode is at least one of a parallel shooting or a converged shooting.

15. The bendable device of claim 13, wherein the processor is further configured to:
  determine a position of the at least two imaging sensors;
  arrange the at least two imaging sensors in the determined position; and
  construct the 3D data item using the bending angle of the bendable device.

16. The bendable device of claim 15, wherein the processor is configured to determine the position of the at least two imaging sensors by:
  performing at least one of a rotation of the at least two imaging sensors, popping-up of the at least two imaging sensors from the bendable device, or tilting of the at least two imaging sensors.

17. The bendable device of claim 16, wherein the processor is configured to select the at least two imaging sensors for constructing the 3D data item using the bending angle by:

determining a personalized biometric associated with the eyes of the user, wherein the personalized biometric associated with the eyes is specific to a user;

identifying the at least two imaging sensors to be used for constructing the 3D data item based on the personalized biometric associated with the eyes of the user and a generalized biometric associated with the eyes associated the bendable device, wherein the generalized biometric associated with the eyes is an average of the biometric associated with the eyes of a plurality of users; and selecting the at least two imaging sensors for constructing the 3D data item using the bending angle.

18. The bendable device of claim 12, wherein the biometric associated with the eyes is unique to the user of the bendable device, wherein the biometric associated with the eyes is determined using the at least two imaging sensors of the bendable device.

19. The bendable device of claim 12, wherein the bendable device comprises:

at least two foldable displays; and a mechanical hinge along an axis of the at least two foldable displays, the mechanical hinge enabling folding of the at least two foldable displays around the axis.

20. The bendable device of claim 12, wherein the bendable device is a flexible display which is rollable and foldable.

21. The bendable device of claim 12, wherein the processor is further configured to:

determine the inter-axial distance between the at least two imaging sensors of the bendable device is equal to the biometric associated with the eyes; and automatically construct the 3D data item of a scene within a field of view of the at least two imaging sensors using the bending angle of the bendable device.

22. The bendable device of claim 12, wherein the biometric of the eyes is one of an inter-pupillary distance (IPD), an inter-iris distance (IID), or an inter-retinal distance (IRD).

* * * * *